US010228460B1

(12) United States Patent
Jinkins et al.

(10) Patent No.: US 10,228,460 B1
(45) Date of Patent: Mar. 12, 2019

(54) WEATHER RADAR ENABLED LOW VISIBILITY OPERATION SYSTEM AND METHOD

(71) Applicant: Rockwell Collins, Inc., Cedar Rapids, IA (US)

(72) Inventors: Richard D. Jinkins, Rewey, WI (US); Richard M. Rademaker, Rijswijk (NL)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 169 days.

(21) Appl. No.: 15/166,191

(22) Filed: May 26, 2016

(51) Int. Cl.
G01S 13/95 (2006.01)
G01S 7/24 (2006.01)
G01S 13/00 (2006.01)

(52) U.S. Cl.
CPC .............. *G01S 13/953* (2013.01); *G01S 7/24* (2013.01)

(58) Field of Classification Search
CPC . G01S 13/953; G01S 7/24; G01S 7/22; G01S 13/90; G01S 13/9023; G01S 13/955; G08G 5/0091
See application file for complete search history.

(56) References Cited

U.S. PATENT DOCUMENTS

| | | |
|---|---|---|
| 2,416,155 A | 2/1947 | Chubb |
| 2,849,184 A | 8/1958 | Arden et al. |
| 2,929,059 A | 3/1960 | Parker |
| 2,930,035 A | 3/1960 | Altekruse |
| 2,948,892 A | 8/1960 | White |
| 2,965,894 A | 12/1960 | Sweeney |
| 2,994,966 A | 8/1961 | Senitsky et al. |
| 3,031,660 A | 4/1962 | Young |
| 3,049,702 A | 8/1962 | Schreitmueller |

(Continued)

FOREIGN PATENT DOCUMENTS

| | | |
|---|---|---|
| DE | 19649838 | 4/1998 |
| DE | 19949737 A1 | 4/2001 |

(Continued)

OTHER PUBLICATIONS

English Translation of Japanese Notice of Reasons for Rejection in Japanese Application No. 2016-001165, dated Apr. 25, 2017, 1 page.

(Continued)

*Primary Examiner* — Bernarr E Gregory
(74) *Attorney, Agent, or Firm* — Donna P. Suchy; Daniel M. Barbieri

(57) ABSTRACT

A weather radar system can be used as an enhanced vision sensor for providing an image on an electronic display during aircraft surface operations. The weather radar sensed image is representative of the external surroundings of the airport surface environment associated with radar returns received by the weather radar system. The radar returns are processed as a collection of radar measurements to determine a high resolution angle and range to a target, using beam sharpening techniques. When the radar image is combined with an image generated from an airport surface database, the combination or comparison of the two independently created images can be used to confirm the integrity of the positioning and attitude source along with the accuracy of the airport surface database.

20 Claims, 8 Drawing Sheets

(56) References Cited

U.S. PATENT DOCUMENTS

| | | |
|---|---|---|
| 3,064,252 A | 11/1962 | Varela |
| 3,070,795 A | 12/1962 | Chambers |
| 3,071,766 A | 1/1963 | Fenn |
| 3,072,903 A | 1/1963 | Meyer |
| 3,089,801 A | 5/1963 | Tierney et al. |
| 3,107,351 A | 10/1963 | Milam |
| 3,113,310 A | 12/1963 | Standing |
| 3,129,425 A | 4/1964 | Sanner |
| 3,153,234 A | 10/1964 | Begeman et al. |
| 3,175,215 A | 3/1965 | Blasberg et al. |
| 3,212,088 A | 10/1965 | Alexander et al. |
| 3,221,328 A | 11/1965 | Walter |
| 3,241,141 A | 3/1966 | Wall |
| 3,274,593 A | 9/1966 | Varela et al. |
| 3,325,807 A | 6/1967 | Burns et al. |
| 3,334,344 A | 8/1967 | Colby, Jr. |
| 3,339,199 A | 8/1967 | Pichafroy |
| 3,373,423 A | 3/1968 | Levy |
| 3,396,391 A | 8/1968 | Anderson et al. |
| 3,397,397 A | 8/1968 | Barney |
| 3,448,450 A | 6/1969 | Alfandari et al. |
| 3,618,090 A | 11/1971 | Garrison |
| 3,680,094 A | 7/1972 | Bayle et al. |
| 3,716,855 A | 2/1973 | Asam |
| 3,739,380 A | 6/1973 | Burdic et al. |
| 3,781,878 A | 12/1973 | Kirkpatrick |
| 3,810,175 A | 5/1974 | Bell |
| 3,815,132 A | 6/1974 | Case et al. |
| 3,816,718 A | 6/1974 | Hall et al. |
| 3,851,758 A | 12/1974 | Makhijani et al. |
| 3,866,222 A | 2/1975 | Young |
| 3,885,237 A | 5/1975 | Kirkpatrick |
| 3,956,749 A | 5/1976 | Magorian |
| 4,024,537 A | 5/1977 | Hart |
| 4,058,701 A | 11/1977 | Gruber et al. |
| 4,058,710 A | 11/1977 | Altmann |
| 4,063,218 A | 12/1977 | Basov et al. |
| 4,103,300 A | 7/1978 | Gendreu et al. |
| 4,235,951 A | 11/1980 | Swarovski |
| 4,277,845 A | 7/1981 | Smith et al. |
| 4,405,986 A | 9/1983 | Gray |
| 4,435,707 A | 3/1984 | Clark |
| 4,481,519 A | 11/1984 | Margerum |
| 4,509,048 A * | 4/1985 | Jain .................. G01S 13/955 342/25 R |
| 4,532,515 A | 7/1985 | Cantrell et al. |
| 4,594,676 A | 6/1986 | Breiholz et al. |
| 4,595,925 A | 6/1986 | Hansen |
| 4,598,292 A | 7/1986 | Devino |
| 4,628,318 A | 12/1986 | Alitz |
| 4,646,244 A | 2/1987 | Bateman et al. |
| 4,649,388 A | 3/1987 | Atlas |
| 4,654,665 A | 3/1987 | Kiuchi et al. |
| 4,685,149 A | 8/1987 | Smith et al. |
| 4,723,124 A * | 2/1988 | Boles .................. G01S 13/9023 342/179 |
| 4,760,396 A | 7/1988 | Barney et al. |
| 4,828,382 A | 5/1989 | Vermilion |
| 4,843,398 A | 6/1989 | Houston et al. |
| 4,912,477 A | 3/1990 | Lory et al. |
| 4,914,436 A | 4/1990 | Bateman et al. |
| 4,924,401 A | 5/1990 | Bice et al. |
| 4,939,513 A | 7/1990 | Paterson et al. |
| 4,951,059 A | 8/1990 | Taylor, Jr. |
| 4,953,972 A | 9/1990 | Zuk |
| 4,965,573 A | 10/1990 | Gallagher et al. |
| 4,987,419 A | 1/1991 | Salkeld |
| 5,045,855 A | 9/1991 | Moreira |
| 5,047,779 A | 9/1991 | Hager |
| 5,047,781 A | 9/1991 | Bleakney |
| 5,049,886 A | 9/1991 | Seitz et al. |
| 5,053,778 A * | 10/1991 | Imhoff .................. G01S 13/90 342/191 |
| 5,166,688 A | 11/1992 | Moreira |
| 5,173,703 A | 12/1992 | Mangiapane et al. |
| 5,175,554 A | 12/1992 | Mangiapane et al. |
| 5,198,819 A | 3/1993 | Susnjara |
| 5,202,690 A | 4/1993 | Frederick |
| 5,247,303 A | 9/1993 | Cornelius et al. |
| 5,273,553 A | 12/1993 | Hoshi et al. |
| 5,311,183 A | 5/1994 | Mathews et al. |
| 5,329,391 A | 7/1994 | Miyamoto et al. |
| 5,332,998 A | 7/1994 | Avignon et al. |
| 5,345,241 A | 9/1994 | Huddle |
| 5,365,356 A | 11/1994 | McFadden |
| 5,383,457 A | 1/1995 | Cohen |
| 5,442,364 A | 8/1995 | Lee et al. |
| 5,530,440 A | 6/1996 | Danzer et al. |
| 5,539,409 A | 7/1996 | Mathews et al. |
| 5,559,515 A | 9/1996 | Alimena et al. |
| 5,559,518 A | 9/1996 | Didomizio |
| 5,566,840 A | 10/1996 | Waldner et al. |
| 5,592,178 A | 1/1997 | Chang et al. |
| 5,678,303 A | 10/1997 | Wichmann |
| 5,736,957 A | 4/1998 | Raney |
| 5,820,080 A | 10/1998 | Eschenbach |
| 5,828,332 A | 10/1998 | Frederick |
| 5,831,570 A | 11/1998 | Ammar et al. |
| 5,839,080 A | 11/1998 | Muller et al. |
| 5,867,119 A | 2/1999 | Corrubia et al. |
| 5,894,286 A | 4/1999 | Morand et al. |
| 5,918,517 A | 7/1999 | Malapert et al. |
| 5,920,276 A | 7/1999 | Frederick |
| 5,923,279 A | 7/1999 | Bamler et al. |
| 5,936,575 A | 8/1999 | Azzarelli et al. |
| 5,942,062 A | 8/1999 | Hassall et al. |
| 5,945,926 A | 8/1999 | Ammar et al. |
| 5,950,512 A | 9/1999 | Fields |
| 5,959,762 A | 9/1999 | Bandettini et al. |
| 5,978,715 A | 11/1999 | Briffe et al. |
| 6,002,347 A | 12/1999 | Daly et al. |
| 6,023,240 A | 2/2000 | Sutton |
| 6,061,016 A | 5/2000 | Lupinski et al. |
| 6,061,022 A | 5/2000 | Menegozzi et al. |
| 6,064,942 A | 5/2000 | Johnson et al. |
| 6,075,484 A | 6/2000 | Daniel et al. |
| 6,092,009 A | 7/2000 | Glover |
| 6,112,141 A | 8/2000 | Briffe et al. |
| 6,112,570 A | 9/2000 | Hruschak |
| 6,122,570 A | 9/2000 | Muller et al. |
| 6,127,944 A | 10/2000 | Daly et al. |
| 6,128,066 A | 10/2000 | Yokozeki |
| 6,128,553 A | 10/2000 | Gordon et al. |
| 6,138,060 A | 10/2000 | Conner et al. |
| 6,150,901 A | 11/2000 | Auken |
| 6,154,151 A | 11/2000 | McElreath et al. |
| 6,154,169 A | 11/2000 | Kuntman |
| 6,157,339 A | 12/2000 | Sato et al. |
| 6,157,891 A | 12/2000 | Lin |
| 6,163,021 A | 12/2000 | Mickelson |
| 6,166,661 A | 12/2000 | Anderson et al. |
| 6,169,770 B1 | 1/2001 | Henely |
| 6,178,391 B1 | 1/2001 | Anderson et al. |
| 6,184,816 B1 | 2/2001 | Zheng et al. |
| 6,188,330 B1 | 2/2001 | Glover |
| 6,194,980 B1 | 2/2001 | Thon |
| 6,199,008 B1 | 3/2001 | Aratow et al. |
| 6,201,494 B1 | 3/2001 | Kronfeld |
| 6,204,806 B1 | 3/2001 | Hoech |
| 6,205,400 B1 | 3/2001 | Lin |
| 6,208,284 B1 | 3/2001 | Woodell et al. |
| 6,219,592 B1 | 4/2001 | Muller et al. |
| 6,233,522 B1 | 5/2001 | Morici |
| 6,236,351 B1 | 5/2001 | Conner et al. |
| 6,259,400 B1 | 7/2001 | Higgins et al. |
| 6,266,114 B1 | 7/2001 | Skarohlid |
| 6,278,799 B1 | 8/2001 | Hoffman |
| 6,281,832 B1 | 8/2001 | McElreath |
| 6,285,298 B1 | 9/2001 | Gordon |
| 6,285,337 B1 | 9/2001 | West et al. |
| 6,285,926 B1 | 9/2001 | Weiler et al. |
| 6,289,277 B1 | 9/2001 | Feyereisen et al. |
| 6,311,108 B1 | 10/2001 | Ammar et al. |
| 6,317,468 B1 | 11/2001 | Meyer |

(56) References Cited

U.S. PATENT DOCUMENTS

| | | |
|---|---|---|
| 6,317,690 B1 | 11/2001 | Gia |
| 6,317,872 B1 | 11/2001 | Gee et al. |
| 6,340,946 B1 | 1/2002 | Wolfson et al. |
| 6,345,127 B1 | 2/2002 | Mitchell |
| 6,359,585 B1 | 3/2002 | Bechman et al. |
| 6,366,013 B1 | 4/2002 | Leenders et al. |
| 6,373,418 B1 | 4/2002 | Abbey |
| 6,374,286 B1 | 4/2002 | Gee et al. |
| 6,377,202 B1 | 4/2002 | Kropfli et al. |
| 6,377,892 B1 | 4/2002 | Johnson et al. |
| 6,388,607 B1 | 5/2002 | Woodell |
| 6,388,608 B1 | 5/2002 | Woodell et al. |
| 6,388,724 B1 | 5/2002 | Campbell et al. |
| 6,389,354 B1 | 5/2002 | Hicks et al. |
| 6,401,038 B2 | 6/2002 | Gia |
| 6,411,890 B1 | 6/2002 | Zimmerman |
| 6,421,000 B1 | 7/2002 | McDowell |
| 6,421,603 B1 | 7/2002 | Pratt et al. |
| 6,424,288 B1 | 7/2002 | Woodell |
| 6,426,717 B1 | 7/2002 | Maloratsky |
| 6,426,720 B1 | 7/2002 | Ross et al. |
| 6,427,122 B1 | 7/2002 | Lin |
| 6,441,773 B1 | 8/2002 | Kelly et al. |
| 6,445,310 B1 | 9/2002 | Bateman et al. |
| 6,448,922 B1 | 9/2002 | Kelly |
| 6,452,511 B1 | 9/2002 | Kelly et al. |
| 6,456,236 B1 | 9/2002 | Hauck et al. |
| 6,456,238 B1 | 9/2002 | Posey |
| 6,462,703 B2 | 10/2002 | Hedrick |
| 6,473,026 B1 | 10/2002 | Ali-Mehenni et al. |
| 6,473,037 B2 | 10/2002 | Vail et al. |
| 6,473,240 B1 | 10/2002 | Dehmlow |
| 6,481,482 B1 | 11/2002 | Shimotomai |
| 6,492,934 B1 | 12/2002 | Hwang et al. |
| 6,501,424 B1 | 12/2002 | Haendel et al. |
| 6,512,476 B1 | 1/2003 | Woodell |
| 6,512,527 B1 | 1/2003 | Barber et al. |
| 6,516,272 B2 | 2/2003 | Lin |
| 6,516,283 B2 | 2/2003 | McCall et al. |
| 6,520,056 B1 | 2/2003 | Nemeth et al. |
| 6,525,674 B1 | 2/2003 | Kelly et al. |
| 6,531,669 B1 | 3/2003 | Miller et al. |
| 6,549,161 B1 | 4/2003 | Woodell |
| 6,567,728 B1 | 5/2003 | Kelly et al. |
| 6,574,030 B1 | 6/2003 | Mosier |
| 6,577,947 B1 | 6/2003 | Kronfeld et al. |
| 6,590,528 B1 | 7/2003 | Dewulf |
| 6,591,171 B1 | 7/2003 | Ammar et al. |
| 6,593,875 B2 | 7/2003 | Bergin et al. |
| 6,600,443 B2 | 7/2003 | Landt |
| 6,603,425 B1 | 8/2003 | Woodell |
| 6,614,057 B2 | 9/2003 | Silvernail et al. |
| 6,650,275 B1 | 11/2003 | Kelly et al. |
| 6,650,291 B1 | 11/2003 | West et al. |
| 6,653,947 B2 | 11/2003 | Dwyer et al. |
| 6,667,710 B2 | 12/2003 | Cornell et al. |
| 6,681,668 B1 | 1/2004 | Smirle |
| 6,690,298 B1 | 2/2004 | Barber et al. |
| 6,690,299 B1 | 2/2004 | Suiter |
| 6,690,317 B2 | 2/2004 | Szeto et al. |
| 6,697,008 B1 | 2/2004 | Sternowski |
| 6,697,012 B2 | 2/2004 | Lodwig et al. |
| 6,710,663 B1 | 3/2004 | Berquist |
| 6,714,186 B1 | 3/2004 | Mosier et al. |
| 6,720,890 B1 | 4/2004 | Ezroni et al. |
| 6,724,344 B1 | 4/2004 | Stockmaster et al. |
| 6,731,236 B1 | 5/2004 | Hager et al. |
| 6,738,011 B1 | 5/2004 | Evans |
| 6,739,929 B2 | 5/2004 | Furukawa et al. |
| 6,741,203 B1 | 5/2004 | Woodell |
| 6,741,208 B1 | 5/2004 | West et al. |
| 6,744,382 B1 | 6/2004 | Lapis et al. |
| 6,744,408 B1 | 6/2004 | Stockmaster |
| 6,757,624 B1 | 6/2004 | Hwang et al. |
| 6,760,155 B2 | 7/2004 | Murayama et al. |
| 6,771,626 B1 | 8/2004 | Golubiewski et al. |
| 6,782,392 B1 | 8/2004 | Weinberger et al. |
| 6,799,095 B1 | 9/2004 | Owen et al. |
| 6,803,245 B2 | 10/2004 | Auch et al. |
| 6,804,614 B1 | 10/2004 | McGraw et al. |
| 6,806,846 B1 | 10/2004 | West |
| 6,807,538 B1 | 10/2004 | Weinberger et al. |
| 6,813,777 B1 | 11/2004 | Weinberger et al. |
| 6,819,983 B1 | 11/2004 | McGraw |
| 6,822,617 B1 | 11/2004 | Mather et al. |
| 6,825,804 B1 | 11/2004 | Doty |
| 6,832,538 B1 | 12/2004 | Hwang |
| 6,839,017 B1 | 1/2005 | Dillman |
| 6,842,288 B1 | 1/2005 | Liu et al. |
| 6,850,185 B1 | 2/2005 | Woodell |
| 6,862,323 B1 | 3/2005 | Loper |
| 6,862,501 B2 | 3/2005 | He |
| 6,865,452 B2 | 3/2005 | Burdon |
| 6,879,280 B1 | 4/2005 | Bull et al. |
| 6,879,886 B2 | 4/2005 | Wilkins et al. |
| 6,882,302 B1 | 4/2005 | Woodell et al. |
| 6,908,202 B2 | 6/2005 | Graf et al. |
| 6,917,396 B2 | 7/2005 | Hiraishi et al. |
| 6,918,134 B1 | 7/2005 | Sherlock et al. |
| 6,933,885 B1 | 8/2005 | Stockmaster et al. |
| 6,938,258 B1 | 8/2005 | Weinberger et al. |
| 6,950,062 B1 | 9/2005 | Mather et al. |
| 6,959,057 B1 | 10/2005 | Tuohino |
| 6,972,727 B1 | 12/2005 | West et al. |
| 6,977,608 B1 | 12/2005 | Anderson et al. |
| 6,984,545 B2 | 1/2006 | Grigg et al. |
| 6,990,022 B2 | 1/2006 | Morikawa et al. |
| 6,992,614 B1 | 1/2006 | Joyce |
| 6,995,726 B1 | 2/2006 | West et al. |
| 6,998,648 B2 | 2/2006 | Silvernail |
| 6,998,908 B1 | 2/2006 | Sternowski |
| 6,999,022 B1 | 2/2006 | Vesel et al. |
| 6,999,027 B1 | 2/2006 | Stockmaster |
| 7,002,546 B1 | 2/2006 | Stuppi et al. |
| 7,010,398 B2 | 3/2006 | Wilkins et al. |
| 7,023,375 B2 | 4/2006 | Klausing et al. |
| 7,026,956 B1 | 4/2006 | Wenger et al. |
| 7,028,304 B1 | 4/2006 | Weinberger et al. |
| 7,030,945 B2 | 4/2006 | Umemoto et al. |
| 7,034,753 B1 | 4/2006 | Elsallal et al. |
| 7,042,387 B2 | 5/2006 | Ridenour et al. |
| 7,053,796 B1 | 5/2006 | Barber |
| 7,057,549 B2 | 6/2006 | Block |
| 7,064,680 B2 | 6/2006 | Reynolds et al. |
| 7,069,120 B1 | 6/2006 | Koenck et al. |
| 7,089,092 B1 | 8/2006 | Wood et al. |
| 7,092,645 B1 | 8/2006 | Sternowski |
| 7,098,913 B1 | 8/2006 | Etherington et al. |
| 7,109,912 B1 | 9/2006 | Paramore et al. |
| 7,109,913 B1 | 9/2006 | Paramore et al. |
| 7,123,260 B2 | 10/2006 | Brust |
| 7,129,885 B1 | 10/2006 | Woodell et al. |
| 7,145,501 B1 | 12/2006 | Manfred et al. |
| 7,148,816 B1 | 12/2006 | Carrico |
| 7,151,507 B1 | 12/2006 | Herting |
| 7,158,072 B1 | 1/2007 | Venkatachalam et al. |
| 7,161,525 B1 | 1/2007 | Finley et al. |
| 7,170,446 B1 | 1/2007 | West et al. |
| 7,170,959 B1 | 1/2007 | Abbey |
| 7,180,476 B1 | 2/2007 | Guell et al. |
| 7,191,406 B1 | 3/2007 | Barber et al. |
| 7,196,329 B1 | 3/2007 | Wood et al. |
| 7,205,933 B1 | 4/2007 | Snodgrass |
| 7,209,070 B2 | 4/2007 | Gilliland et al. |
| 7,212,216 B2 | 5/2007 | He et al. |
| 7,218,268 B2 | 5/2007 | Vandenberg |
| 7,219,011 B1 | 5/2007 | Barber |
| 7,242,343 B1 | 7/2007 | Woodell |
| 7,242,345 B2 | 7/2007 | Raestad et al. |
| 7,250,903 B1 | 7/2007 | McDowell |
| 7,265,710 B2 | 9/2007 | Deagro |
| 7,269,657 B1 | 9/2007 | Alexander et al. |
| 7,272,472 B1 | 9/2007 | McElreath |
| 7,273,403 B2 | 9/2007 | Yokota et al. |

(56) References Cited

U.S. PATENT DOCUMENTS

| | | | |
|---|---|---|---|
| 7,280,068 B2 | 10/2007 | Lee et al. |
| 7,289,058 B2 | 10/2007 | Shima |
| 7,292,178 B1 | 11/2007 | Woodell et al. |
| 7,292,180 B2 | 11/2007 | Schober |
| 7,295,150 B2 | 11/2007 | Burlet et al. |
| 7,295,901 B1 | 11/2007 | Little et al. |
| 7,301,496 B2 | 11/2007 | Honda et al. |
| 7,307,576 B1 | 12/2007 | Koenigs |
| 7,307,577 B1 | 12/2007 | Kronfeld et al. |
| 7,307,583 B1 | 12/2007 | Woodell et al. |
| 7,312,725 B2 | 12/2007 | Berson et al. |
| 7,312,743 B2 | 12/2007 | Ridenour et al. |
| 7,317,427 B2 | 1/2008 | Pauplis et al. |
| 7,321,332 B2 | 1/2008 | Focke et al. |
| 7,337,043 B2 | 2/2008 | Bull |
| 7,349,154 B2 | 3/2008 | Aiura et al. |
| 7,352,292 B2 | 4/2008 | Alter et al. |
| 7,361,240 B2 | 4/2008 | Kim |
| 7,372,394 B1 | 5/2008 | Woodell et al. |
| 7,373,223 B2 | 5/2008 | Murphy |
| 7,375,678 B2 | 5/2008 | Feyereisen et al. |
| 7,379,014 B1 | 5/2008 | Woodell et al. |
| 7,379,796 B2 | 5/2008 | Walsdorf et al. |
| 7,381,110 B1 | 6/2008 | Sampica et al. |
| 7,417,578 B1 | 8/2008 | Woodell et al. |
| 7,417,579 B1 | 8/2008 | Woodell |
| 7,423,578 B1 | 9/2008 | Tietjen |
| 7,446,697 B2 | 11/2008 | Burlet et al. |
| 7,446,938 B2 | 11/2008 | Miyatake et al. |
| 7,452,258 B1 | 11/2008 | Marzen et al. |
| 7,474,262 B2 | 1/2009 | Alland |
| 7,479,920 B2 | 1/2009 | Niv |
| 7,486,220 B1 | 2/2009 | Kronfeld et al. |
| 7,486,291 B2 | 2/2009 | Berson et al. |
| 7,492,304 B1 | 2/2009 | Woodell et al. |
| 7,492,305 B1 | 2/2009 | Woodell et al. |
| 7,515,069 B2 * | 4/2009 | Dorneich .................. G01S 7/22 |
| | | | 340/945 |
| 7,515,087 B1 | 4/2009 | Woodell et al. |
| 7,515,088 B1 | 4/2009 | Woodell et al. |
| 7,525,448 B1 | 4/2009 | Wilson et al. |
| 7,528,765 B1 | 5/2009 | Woodell et al. |
| 7,528,915 B2 | 5/2009 | Choi et al. |
| 7,541,970 B1 | 6/2009 | Godfrey et al. |
| 7,541,971 B1 | 6/2009 | Woodell et al. |
| 7,551,451 B2 | 6/2009 | Kim et al. |
| 7,557,735 B1 | 7/2009 | Woodell et al. |
| 7,566,254 B2 | 7/2009 | Sampica et al. |
| 7,570,177 B2 | 8/2009 | Reynolds et al. |
| 7,576,680 B1 | 8/2009 | Woodell |
| 7,603,209 B2 | 10/2009 | Dwyer et al. |
| 7,609,200 B1 | 10/2009 | Woodell et al. |
| 7,612,706 B2 | 11/2009 | Honda et al. |
| 7,616,150 B1 | 11/2009 | Woodell |
| 7,633,428 B1 | 12/2009 | McCusker et al. |
| 7,633,430 B1 | 12/2009 | Wichgers et al. |
| 7,633,584 B2 | 12/2009 | Umemoto et al. |
| 7,639,175 B1 | 12/2009 | Woodell |
| 7,664,601 B2 | 2/2010 | Daly, Jr. |
| 7,675,461 B1 | 3/2010 | McCusker et al. |
| 7,693,621 B1 | 4/2010 | Chamas |
| 7,696,921 B1 | 4/2010 | Finley et al. |
| 7,714,767 B1 | 5/2010 | Kronfeld et al. |
| 7,733,264 B1 | 6/2010 | Woodell et al. |
| 7,783,427 B1 | 8/2010 | Woodell et al. |
| 7,783,429 B2 | 8/2010 | Walden et al. |
| 7,791,529 B2 | 9/2010 | Filias et al. |
| 7,808,422 B1 | 10/2010 | Woodell et al. |
| 7,814,676 B2 | 10/2010 | Sampica et al. |
| 7,843,380 B1 | 11/2010 | Woodell |
| 7,859,448 B1 | 12/2010 | Woodell et al. |
| 7,859,449 B1 | 12/2010 | Woodell et al. |
| 7,864,103 B2 | 1/2011 | Weber et al. |
| 7,868,811 B1 | 1/2011 | Woodell et al. |
| 7,872,594 B1 | 1/2011 | Vesel |
| 7,889,117 B1 | 2/2011 | Woodell et al. |
| 7,889,118 B1 | 2/2011 | Finley et al. |
| 7,927,440 B2 | 4/2011 | Matsuhira |
| 7,929,086 B2 | 4/2011 | Toyama et al. |
| 7,965,223 B1 | 6/2011 | McCusker |
| 7,965,225 B1 | 6/2011 | Dickerson et al. |
| 8,035,547 B1 | 10/2011 | Flanigan et al. |
| 8,038,498 B2 | 10/2011 | Miyauchi et al. |
| 8,045,098 B2 | 10/2011 | Kitagawa et al. |
| 8,059,025 B2 | 11/2011 | D'Addio |
| 8,068,984 B2 | 11/2011 | Smith et al. |
| 8,072,368 B1 | 12/2011 | Woodell |
| 8,077,078 B1 | 12/2011 | Woodell et al. |
| 8,077,081 B2 * | 12/2011 | Bateman ............... G01S 13/953 |
| | | | 342/195 |
| 8,102,487 B2 | 1/2012 | Kitagawa et al. |
| 8,118,075 B2 | 2/2012 | Sampica et al. |
| 8,137,498 B2 | 3/2012 | Sampica et al. |
| 8,140,223 B2 | 3/2012 | Whitehead et al. |
| 8,159,464 B1 | 4/2012 | Gribble et al. |
| 8,232,917 B2 | 7/2012 | Scherzinger et al. |
| 8,289,202 B1 * | 10/2012 | Christianson ......... G01S 13/953 |
| | | | 342/26 B |
| 8,296,065 B2 | 10/2012 | Haynie et al. |
| 8,373,580 B2 | 2/2013 | Bunch et al. |
| 8,410,975 B1 | 4/2013 | Bell et al. |
| 8,477,062 B1 | 7/2013 | Kanellis |
| 8,486,535 B1 | 7/2013 | Nemeth et al. |
| 8,493,241 B2 | 7/2013 | He |
| 8,515,600 B1 | 8/2013 | McCusker |
| 8,540,002 B2 | 9/2013 | Sampica et al. |
| 8,558,731 B1 | 10/2013 | Woodell |
| 8,576,112 B2 | 11/2013 | Garrec et al. |
| 8,583,315 B2 | 11/2013 | Whitehead et al. |
| 8,594,879 B2 | 11/2013 | Roberge et al. |
| 8,603,288 B2 | 12/2013 | Sampica et al. |
| 8,634,993 B2 | 1/2014 | McClure et al. |
| 8,639,416 B2 | 1/2014 | Jones et al. |
| 8,643,533 B1 | 2/2014 | Woodell et al. |
| 8,691,043 B2 | 4/2014 | Sampica et al. |
| 8,717,226 B2 | 5/2014 | Bon et al. |
| 8,755,954 B1 | 6/2014 | McCusker et al. |
| 8,773,301 B1 | 7/2014 | Woodell |
| 8,847,794 B2 * | 9/2014 | Buratto ............... G08G 5/0091 |
| | | | 340/971 |
| 8,896,480 B1 | 11/2014 | Wilson et al. |
| 8,909,471 B1 | 12/2014 | Jinkins et al. |
| 8,917,191 B1 | 12/2014 | Tiana et al. |
| 8,936,057 B2 | 1/2015 | Sampica et al. |
| 8,976,042 B1 | 3/2015 | Chiew et al. |
| 8,977,491 B1 | 3/2015 | McCusker et al. |
| 9,024,805 B1 | 5/2015 | Jinkins et al. |
| 9,354,633 B1 | 5/2016 | McCusker et al. |
| 2001/0023390 A1 | 9/2001 | Gia |
| 2001/0050372 A1 | 12/2001 | Krijn et al. |
| 2001/0053648 A1 | 12/2001 | Furukawa et al. |
| 2002/0039070 A1 | 4/2002 | Ververs et al. |
| 2002/0111717 A1 | 8/2002 | Scherzinger et al. |
| 2002/0116125 A1 | 8/2002 | Lin |
| 2002/0116126 A1 | 8/2002 | Lin |
| 2002/0158256 A1 | 10/2002 | Yamada et al. |
| 2002/0179229 A1 | 12/2002 | Chuzles |
| 2002/0185600 A1 | 12/2002 | Kerr |
| 2002/0187284 A1 | 12/2002 | Kinoshita et al. |
| 2003/0021491 A1 | 1/2003 | Brust |
| 2003/0038916 A1 | 2/2003 | Nakano et al. |
| 2003/0043315 A1 | 3/2003 | Umemoto et al. |
| 2003/0071828 A1 | 4/2003 | Wilkins et al. |
| 2003/0089214 A1 | 5/2003 | Fukuta et al. |
| 2003/0093187 A1 | 5/2003 | Walker |
| 2003/0102999 A1 | 6/2003 | Bergin et al. |
| 2003/0156238 A1 | 8/2003 | Hiraishi et al. |
| 2003/0160718 A1 | 8/2003 | Nagasaku |
| 2003/0174396 A1 | 9/2003 | Murayama et al. |
| 2003/0180528 A1 | 9/2003 | Flosenzier et al. |
| 2003/0189606 A1 | 10/2003 | Moon et al. |
| 2003/0195672 A1 | 10/2003 | He |
| 2003/0216859 A1 | 11/2003 | Martell et al. |
| 2003/0222887 A1 | 12/2003 | Wilkins et al. |

(56) References Cited

U.S. PATENT DOCUMENTS

| | | |
|---|---|---|
| 2004/0044445 A1 | 3/2004 | Burdon |
| 2004/0059473 A1 | 3/2004 | He |
| 2004/0066645 A1 | 4/2004 | Graf et al. |
| 2004/0072575 A1 | 4/2004 | Young et al. |
| 2004/0083038 A1 | 4/2004 | He |
| 2004/0145499 A1 | 7/2004 | Schmidt et al. |
| 2004/0160341 A1 | 8/2004 | Feyereisen et al. |
| 2004/0160364 A1 | 8/2004 | Regev |
| 2004/0181318 A1 | 9/2004 | Redmond et al. |
| 2004/0264549 A1 | 12/2004 | Hoole |
| 2005/0004748 A1 | 1/2005 | Pinto et al. |
| 2005/0052451 A1 | 3/2005 | Servantie |
| 2005/0073455 A1 | 4/2005 | Chow et al. |
| 2005/0126679 A1 | 6/2005 | Kim |
| 2005/0136625 A1 | 6/2005 | Henseler et al. |
| 2005/0150289 A1 | 7/2005 | Osborne |
| 2005/0174350 A1 | 8/2005 | Ridenour et al. |
| 2005/0200502 A1 | 9/2005 | Reusser et al. |
| 2005/0225481 A1 | 10/2005 | Bonthron |
| 2005/0230563 A1 | 10/2005 | Corcoran, III |
| 2006/0004497 A1 | 1/2006 | Bull |
| 2006/0097895 A1 | 5/2006 | Reynolds et al. |
| 2006/0098452 A1 | 5/2006 | Choi et al. |
| 2006/0164284 A1 | 7/2006 | Pauplis et al. |
| 2006/0207967 A1 | 9/2006 | Bocko et al. |
| 2006/0215265 A1 | 9/2006 | Miyatake et al. |
| 2006/0227012 A1 | 10/2006 | He |
| 2006/0244636 A1 | 11/2006 | Rye et al. |
| 2006/0245171 A1 | 11/2006 | Kim et al. |
| 2006/0290253 A1 | 12/2006 | Yeo et al. |
| 2006/0290531 A1 | 12/2006 | Reynolds et al. |
| 2007/0001897 A1 | 1/2007 | Alland |
| 2007/0002078 A1 | 1/2007 | He et al. |
| 2007/0008214 A1 | 1/2007 | Wasiewicz |
| 2007/0013575 A1 | 1/2007 | Lee et al. |
| 2007/0018887 A1 | 1/2007 | Feyereisen et al. |
| 2007/0032951 A1 | 2/2007 | Tanenhaus et al. |
| 2007/0060063 A1 | 3/2007 | Wright et al. |
| 2007/0146364 A1 | 6/2007 | Aspen |
| 2007/0171094 A1 | 7/2007 | Alter et al. |
| 2007/0176794 A1 | 8/2007 | Feyereisen et al. |
| 2007/0179684 A1 | 8/2007 | He |
| 2007/0228586 A1 | 10/2007 | Merrill et al. |
| 2007/0247350 A1 | 10/2007 | Ryan |
| 2007/0279253 A1 | 12/2007 | Priest |
| 2007/0297736 A1 | 12/2007 | Sherman et al. |
| 2008/0018524 A1 | 1/2008 | Christianson |
| 2008/0051947 A1 | 2/2008 | Kemp |
| 2008/0074308 A1 | 3/2008 | Becker et al. |
| 2008/0111731 A1 | 5/2008 | Hubbard et al. |
| 2008/0145610 A1 | 6/2008 | Muller et al. |
| 2008/0180351 A1 | 7/2008 | He |
| 2008/0305721 A1 | 12/2008 | Ohashi et al. |
| 2009/0021397 A1 | 1/2009 | Wipf et al. |
| 2009/0040070 A1 | 2/2009 | Alter et al. |
| 2009/0040772 A1 | 2/2009 | Laney |
| 2009/0046229 A1 | 2/2009 | Umemoto et al. |
| 2009/0148682 A1 | 6/2009 | Higuchi |
| 2009/0152391 A1 | 6/2009 | McWhirk |
| 2009/0153783 A1 | 6/2009 | Umemoto |
| 2009/0164067 A1 | 6/2009 | Whitehead et al. |
| 2009/0207048 A1 | 8/2009 | He et al. |
| 2009/0279030 A1 | 11/2009 | Toyama et al. |
| 2009/0279175 A1 | 11/2009 | Laney et al. |
| 2010/0033499 A1 | 2/2010 | Gannon et al. |
| 2010/0103353 A1 | 4/2010 | Yamada |
| 2010/0297406 A1 | 11/2010 | Schaffer et al. |
| 2010/0312428 A1 | 12/2010 | Roberge et al. |
| 2010/0312461 A1 | 12/2010 | Haynie et al. |
| 2011/0037616 A1 | 2/2011 | Leutelt et al. |
| 2011/0054729 A1 | 3/2011 | Whitehead et al. |
| 2011/0075070 A1 | 3/2011 | Kitagawa et al. |
| 2011/0141405 A1 | 6/2011 | Kitagawa et al. |
| 2011/0165361 A1 | 7/2011 | Sherman et al. |
| 2011/0184594 A1 | 7/2011 | Manfred et al. |
| 2011/0273325 A1 | 11/2011 | Goldman |
| 2011/0282580 A1 | 11/2011 | Mohan |
| 2011/0304479 A1 | 12/2011 | Chen et al. |
| 2012/0053831 A1 | 3/2012 | Halder |
| 2012/0133546 A1 | 5/2012 | Reiter |
| 2012/0150426 A1 | 6/2012 | Conway |
| 2012/0174445 A1 | 7/2012 | Jones et al. |
| 2012/0176497 A1 | 7/2012 | Shadmi |
| 2012/0215410 A1 | 8/2012 | McClure et al. |
| 2013/0041529 A1 | 2/2013 | He et al. |
| 2013/0234884 A1 | 9/2013 | Bunch et al. |
| 2013/0285847 A1 | 10/2013 | Ward |
| 2014/0009324 A1 | 1/2014 | Ranney et al. |
| 2015/0211883 A1 | 7/2015 | He |
| 2016/0131739 A1 | 5/2016 | Jinkins et al. |

FOREIGN PATENT DOCUMENTS

| | | |
|---|---|---|
| EP | 0 556 351 B1 | 6/1995 |
| EP | 0 962 752 A1 | 12/1999 |
| GB | 814 744 A | 6/1959 |
| GB | 1 092 821 A | 11/1967 |
| JP | 01-210328 | 8/1989 |
| JP | 05-200880 | 8/1993 |
| JP | 05-293895 | 11/1993 |
| JP | 06-051484 | 2/1994 |
| JP | H08-220547 A | 8/1996 |
| JP | 09-057779 | 3/1997 |
| JP | 10-156853 | 6/1998 |
| JP | 10-244589 | 9/1998 |
| JP | 2000-141388 | 5/2000 |
| JP | 2004-233590 | 8/2004 |
| JP | 2004-354645 | 12/2004 |
| JP | 2006-218658 | 8/2006 |
| JP | 2006-334912 | 12/2006 |
| JP | 2006-348208 | 12/2006 |
| JP | 2007-206559 | 8/2007 |
| JP | 2008-238607 | 1/2008 |
| WO | WO-93/05634 | 3/1993 |
| WO | WO-2009/133102 A1 | 11/2009 |
| WO | WO-2011/089474 A2 | 7/2011 |

OTHER PUBLICATIONS

First Office Action with English Translation of Chinese Application No. 201510005057.5, dated Apr. 25, 2017, 8 pages.

U.S. Notice of Allowance on U.S. Appl. No. 14/482,681 dated May 1, 2017.

U.S. Office Action on U.S. Appl. No. 14/536,330 dated Aug. 11, 2017.

U.S. Appl. No. 15/222,923, filed Jul. 28, 2016, Rockwell Collins, Inc.

Final Office Action on U.S. Appl. No. 14/536,330, dated Jan. 23, 2017, 14 pages.

Non-Final Office Action on U.S. Appl. No. 13/250,798, dated Sep. 9, 2016, 6 pages.

Non-Final Office Action on U.S. Appl. No. 14/482,681, dated Dec. 20, 2016, 9 pages.

Corrected Notice of Allowability on U.S. Appl. No. 13/250,798, dated Jan. 12, 2017, 2 pages.

Notice of Allowance for U.S. Appl. No. 14/536,330 dated Dec. 13, 2017. 7 pages.

U.S. Appl. No. 11/851,323, filed Sep. 6, 2007, McCusker.

U.S. Appl. No. 11/863,219, filed Sep. 27, 2007, Woodell.

U.S. Appl. No. 11/863,221, filed Sep. 27, 2007, Woodell.

U.S. Appl. No. 11/899,801, filed Sep. 6, 2007, Woodell et al.

U.S. Appl. No. 11/900,002, filed Sep. 6, 2007, Woodell et al.

U.S. Appl. No. 12/167,200, filed Jul. 2, 2008, Woodell et al.

U.S. Appl. No. 12/167,203, filed Jul. 2, 2008, Woodell.

U.S. Appl. No. 12/167,208, filed Jul. 2, 2008, Dickerson et al.

U.S. Appl. No. 12/180,293, filed Jul. 25, 2008, Woodell et al.

U.S. Appl. No. 12/236,464, filed Sep. 23, 2008, Rockwell Collins.

U.S. Appl. No. 12/786,169, filed May 24, 2010, Nemeth et al.

U.S. Appl. No. 13/224,992, filed Sep. 2, 2011, Hufnagel et al.

U.S. Appl. No. 13/250,307, filed Sep. 30, 2011, Jinkins.

(56) References Cited

OTHER PUBLICATIONS

U.S. Appl. No. 13/250,798, filed Sep. 30, 2011, Jinkins.
U.S. Appl. No. 13/627,788, filed Sep. 26, 2012, Rockwell Collins.
U.S. Appl. No. 13/857,955, filed Apr. 5, 2013, Barber et al.
"MountainScope™ on a TabletPC," PCAvionics™, 2007, printed from website www.pcavionics.com on Aug. 28, 2007, 1 page.
TAWS Class A and Class B, Terrain Awareness and Warning Systems, Universal® Avionics Systems Corporation, Sep. 2007, 6 pages.
U.S. Appl. No. 14/301,199, filed Jun. 10, 2014, Rockwell Collins.
U.S. Appl. No. 14/482,681, filed Sep. 10, 2014, Rockwell Collins.
U.S. Appl. No. 14/841,558, filed Aug. 31, 2015, Rockwell Collins, Inc.
"TAWS Terrain Awareness and Warning System," Universal® Avionics, 2006, printed from website www.uasc.com on Aug. 28, 2007, 2 pages.
Adams, Charlotte, "Synthetic Vision: Picturing the Future," Avionics magazine, Oct. 1, 2006, printed from website www.aviationtoday.com, 4 pages.
Adams, Charlotte, "Synthetic Vision: Picturing the Future," Avionics magazine, Solutions for Global Airspace Electronics, Oct. 2006, cover and pp. 22-29.
Airports Authority of India, Chapter 7: Visual Aids for Navigation—Lights, available prior to Jan. 1, 2005, retrieved from the internet at: http://www.aai.aero/aai_employees/chapter_7.pdf on Sep. 26, 2014, 33 pages.
Blue Mountain Avionics' Products, 2007, printed from website www.bluemountainavionics.com on Aug. 28, 2007, 4 pages.
Brailovsky et al., REVS122: A Radar-Based Enhanced Vision System for Degraded Visual Environments, Proc. of SPIE vol. 9087 908708-1, Jun. 19, 2014, retrieved from the internet at http://proceedings.spiedigitallibrary.org on Jun. 25, 2014, 13 pages.
Carter, S. P., D. D. Blankenship, M. E. Peters, D. A. Young, J. W. Holt, and D. L. Morse (2007), Radar-based subglacial lake classification in Antarctica, Geochem. Geophys. Geosyst., 8, 003016, doi:10.1029/2006GC001408, 20 pages.
Federal Aviation Administration, Advisory Circular AC 90-106, "Enhanced Flight Vision Systems", initiated by AFS-400, dated Jun. 2, 2010, 55 pages.
Federal Aviation Administration, Aeronautical Information Manual (AIM) Basic Flight Information and ATC Procedures, dated Jul. 24, 2014, 2 pages.
Final Office Action on U.S. Appl. No. 13/250,798 dated Sep. 4, 2014, 22 pages.
Final Office Action on U.S. Appl. No. 13/867,556 dated Jul. 3, 2014, 11 pages.
Final Office Action on U.S. Appl. No. 13/250,307 dated Jun. 11, 2014, 8 pages.
Final Office Action on U.S. Appl. No. 13/250,798 dated Aug. 7, 2015, 21 pages.
Fountain, J.R., Digital Terrain Systems, Airborne Navigation Systems Workshop (Digest No. 1997/169), IEE Colloquium, pp. 4/1-4/6, Feb. 21, 1997.
G2000, Garmin, printed from website https://buy.garmin.com/shop/shop.do?cID=153&pID=97668 on Jun. 28, 2011, 2 pages.
G3000, Garmin, printed from website https://buy.garmin.com/shop/shop.do?cID=153&pID=66916 on Jun. 28, 2011, 2 pages.
G5000, Garmin, printed from website https://buy.garmin.com/shop/shop.do?cID=153&pID=90821&ra=true on Apr. 20, 2011, 2 pages.
Honeywell, RDR-4B Forward looking windshear detection / weather radar system user's manual with radar operating guidelines, Rev. 6, Jul. 2003, 106 pages.
Johnson, A., et al., Vision Guided Landing of an Autonomous Helicopter in Hazardous Terrain, Robotics and Automation, 2005. ICRA 2005. Proceedings of the 2005 IEEE International Conference, pp. 3966-3971, Apr. 18-22, 2005.
Kuntman, D., Airborne system to address leading cause of injuries in non-fatal airline accidents, ICAO Journal, Mar. 2000, 4 pages.
McGray et al., Air Operators, Airlines, Manufacturers and Interested Industry Stakeholders & Aero Chart Forum-Utilizing EFVS technology and incorporating it into FAA NextGen, Federal Aviation Administration, Apr. 23 & 30, 2014, 34 pages.
Non-Final Office Action on U.S. Appl. No. 13/250,798 dated Feb. 26, 2016, 9 pages.
Non-Final Office Action on U.S. Appl. No. 13/250,798 dated Mar. 18, 2015, 21 pages.
Non-Final Office Action on U.S. Appl. No. 14/301,199 dated Sep. 9, 2015, 18 pages.
Non-Final Office Action on U.S. Appl. No. 14/536,330 dated Jul. 13, 2016, 12 pages.
Notice of Allowance for U.S. Appl. No. 11/863,215, dated Oct. 13, 2009, 8 pages.
Notice of Allowance for U.S. Appl. No. 11/863,219, dated Jun. 23, 2009, 7 pages.
Notice of Allowance for U.S. Appl. No. 11/863,221, dated Aug. 2, 2010, 9 pages.
Notice of Allowance for U.S. Appl. No. 11/899,801, dated Aug. 19, 2010, 5 pages.
Notice of Allowance for U.S. Appl. No. 11/900,002, dated Sep. 14, 2010, 5 pages.
Notice of Allowance for U.S. Appl. No. 12/009,372, dated Oct. 13, 2011, 8 pages.
Notice of Allowance for U.S. Appl. No. 12/009,373, dated Jun. 16, 2010, 4 pages.
Notice of Allowance for U.S. Appl. No. 12/009,472, dated Sep. 5, 2013, 8 pages.
Notice of Allowance for U.S. Appl. No. 12/167,200, dated Oct. 28, 2010, 5 pages.
Notice of Allowance for U.S. Appl. No. 12/167,203, dated Jun. 21, 2013, 7 pages.
Notice of Allowance for U.S. Appl. No. 12/167,208, dated Mar. 21, 2011, 8 pages.
Notice of Allowance for U.S. Appl. No. 12/180,293, dated Aug. 4, 2011, 8 pages.
Notice of Allowance for U.S. Appl. No. 12/786,169, dated Mar. 28, 2013, 6 pages.
Notice of Allowance for U.S. Appl. No. 13/538,957, dated Oct. 3, 2013, 13 pages.
Notice of Allowance on U.S. Appl. No. 12/263,282 dated Jan. 29, 2016, 8 pages.
Notice of Allowance on U.S. Appl. No. 13/241,051 dated Aug. 28, 2014, 9 pages.
Notice of Allowance on U.S. Appl. No. 13/247,742 dated Jul. 30, 2014, 9 pages.
Notice of Allowance on U.S. Appl. No. 14/301,199 dated Mar. 1, 2016, 11 pages.
Office Action for U.S. Appl. No. 11/851,323, dated Dec. 15, 2010, 13 pages.
Office Action for U.S. Appl. No. 11/851,323, dated Aug. 6, 2009, 23 pages.
Office Action for U.S. Appl. No. 11/851,323, dated Jul. 5, 2012, 23 pages.
Office Action for U.S. Appl. No. 11/863,215, dated May 27, 2009, 5 pages.
Office Action for U.S. Appl. No. 11/863,215, dated Nov. 12, 2008, 8 pages.
Office Action for U.S. Appl. No. 11/863,219, dated Dec. 12, 2008, 7 pages.
Office Action for U.S. Appl. No. 11/863,221, dated Dec. 18, 2009, 5 pages.
Office Action for U.S. Appl. No. 11/863,221, dated Dec. 8, 2008, 8 pages.
Office Action for U.S. Appl. No. 11/863,221, dated May 26, 2009, 5 pages.
Office Action for U.S. Appl. No. 12/009,372, dated Dec. 20, 2010, 10 pages.
Office Action for U.S. Appl. No. 12/009,372, dated Jun. 13, 2011, 9 pages.
Office Action for U.S. Appl. No. 12/009,373, dated Dec. 30, 2009, 14 pages.

(56) References Cited

OTHER PUBLICATIONS

Office Action for U.S. Appl. No. 12/009,472, dated Apr. 16, 2012, 16 pages.
Office Action for U.S. Appl. No. 12/009,472, dated Jan. 14, 2011, 14 pages.
Office Action for U.S. Appl. No. 12/009,472, dated Mar. 20, 2013, 15 pages.
Office Action for U.S. Appl. No. 12/009,472, dated Nov. 3, 2011, 15 pages.
Office Action for U.S. Appl. No. 12/009,472, dated Nov. 9, 2012, 15 pages.
Office Action for U.S. Appl. No. 12/167,200, dated Jul. 21, 2010, 6 pages.
Office Action for U.S. Appl. No. 12/167,203, dated Aug. 26, 2010, 9 pages.
Office Action for U.S. Appl. No. 12/167,203, dated Jul. 20, 2011, 6 pages.
Office Action for U.S. Appl. No. 12/167,203, dated Mar. 7, 2013, 5 pages.
Office Action for U.S. Appl. No. 12/167,203, dated Oct. 31, 2011, 5 pages.
Office Action for U.S. Appl. No. 12/167,203, dated Sep. 21, 2012, 6 pages.
Office Action for U.S. Appl. No. 12/167,208, dated Dec. 30, 2009, 10 pages.
Office Action for U.S. Appl. No. 12/167,208, dated Feb. 7, 2011, 8 pages.
Office Action for U.S. Appl. No. 12/167,208, dated Jun. 3, 2010, 11 pages.
Office Action for U.S. Appl. No. 12/167,208, dated Oct. 19, 2010, 8 pages.
Office Action for U.S. Appl. No. 12/180,293, dated Jan. 4, 2011, 5 pages.
Office Action for U.S. Appl. No. 12/180,293, dated Jul. 28, 2010, 8 pages.
Office Action for U.S. Appl. No. 12/263,282, dated Jan. 5, 2012, 10 pages.
Office Action for U.S. Appl. No. 12/786,169, dated Jan. 18, 2013, 14 pages.
Office Action for U.S. Appl. No. 12/892,563, dated Feb. 19, 2013, 12 pages.
Office Action for U.S. Appl. No. 12/976,871, dated Feb. 15, 2012, 8 pages.
Office Action for U.S. Appl. No. 12/976,871, dated Jul. 10, 2012, 4 pages.
Office Action for U.S. Appl. No. 12/976,871, dated May 6, 2013, 5 pages.
Office Action for U.S. Appl. No. 12/976,871, dated Nov. 21, 2012, 5 pages.
Office Action for U.S. Appl. No. 12/976,871, dated Oct. 9, 2013, 5 pages.
Office Action for U.S. Appl. No. 13/183,314, dated Aug. 14, 2013, 11 pages.
Office Action for U.S. Appl. No. 13/183,314, dated Mar. 28, 2013, 12 pages.
Office Action for U.S. Appl. No. 13/224,992, dated Feb. 28, 2013, 10 pages.
Office Action for U.S. Appl. No. 13/250,307, dated Nov. 5, 2013, 11 pages.
Office Action for U.S. Appl. No. 13/474,559, dated Aug. 28, 2013, 10 pages.
Office Action for U.S. Appl. No. 13/474,559, dated Dec. 28, 2012, 8 pages.
Office Action for U.S. Appl. No. 13/538,957, dated Apr. 4, 2013, 19 pages.
Office Action for U.S. Appl. No. 13/538,957, dated Oct. 5, 2012, 18 pages.
Office Action for U.S. Appl. No. 13/743,182, dated Apr. 8, 2013, 10 pages.
Office Action for U.S. Appl. No. 12/786,169, dated Jul. 20, 2012, 8 pages.
Office Action in Japanese Patent Application 2015-116688, dated Aug. 25, 2015, 4 pages.
Office Action in Japanese Patent Application 2015-116716, dated Aug. 25, 2015, 3 pages.
Office Action on U.S. Appl. No. 12/236,464, dated Jul. 12, 2013, 17 pages.
Office Action on U.S. Appl. No. 11/787,460, dated Mar. 19, 2010, 16 pages.
Office Action on U.S. Appl. No. 11/787,460, dated Sep. 16, 2009, 15 pages.
Office Action on U.S. Appl. No. 12/236,464, dated Feb. 11, 2014, 21 pages.
Office Action on U.S. Appl. No. 12/236,464, dated Jun. 22, 2011, 14 pages.
Office Action on U.S. Appl. No. 12/892,563, dated May 7, 2013, 6 pages.
Office Action on U.S. Appl. No. 12/892,563, dated Oct. 10, 2012, 12 pages.
Office Action on U.S. Appl. No. 13/241,051 dated Feb. 27, 2014, 21 pages.
Office Action on U.S. Appl. No. 13/247,742 dated Dec. 3, 2013, 11 pages.
Office Action on U.S. Appl. No. 13/250,798 dated Apr. 23, 2014, 15 pages.
Office Action on U.S. Appl. No. 13/627,788, dated Jul. 28, 2014, 10 pages.
Office Action on U.S. Appl. No. 13/867,556 dated Feb. 7, 2014, 11 pages.
Office Action U.S. Appl. No. 11/787,460, dated Aug. 31, 2010, 18 pages.
Office Action with English Translation received in Korean Patent Application 10-2010-7017278, dated Aug. 26, 2015, 5 pages.
Pictures of DELPHINS, printed from website www.tunnel-in-the-sky.tudelft.nl on Aug. 28, 2007, 4 pages.
Revs Product Information Sheet, Sierra Nevada Corporation, dated May 7, 2014, 2 pages.
Skolnik, Introduction to Radar Systems, McGraw Hill Book Company, 2001, 3 pages.
Skolnik, Radar Handbook (McGraw Hill Book Company), 1990, 23 pages.
Synthetic Vision System, en.wikipedia.org/wiki/Synthetic_vision_system, retrieved Feb. 28, 2013, 4 pages.
Technical Standard Order, TSO-C115b, Airborne Area Navigation Equipment Using Multi-Sensor Inputs, Department of Transportation, Federal Aviation Administration, Sep. 30, 1994, 11 pages.
U.S. Office Action on U.S. Appl. No. 11/900,002 dated Jun. 8, 2010, 7 pages.
U.S. Office Action on U.S. Appl. No. 13/247,742 dated Apr. 16, 2014, 15 pages.
Vadlamani, A., et al., Improving the detection capability of spatial failure modes using downward-looking sensors in terrain database integrity monitors, Digital Avionics Systems Conference, 2003. DASC-03. The 22nd, vol. 2, pp. 9C.5-91-12 vol. 2, Oct. 12-16, 2003.
Van Kasteren, Joost, "Tunnel-in-the-Sky, Synthetic vision simplifies the pilot's job and enhances safety," printed from website www.delftoutlook.tudelft.nl on Aug. 28, 2007, 13 pages.
Wang et al., A Simple Based on DSP Antenna Controller of Weather Radar, 2001 CIE International Conference, 4 pages.
Non-Final Office Action for U.S. Appl. No. 15/222,923 dated Aug. 31, 2018. 11 pages.

* cited by examiner

WEATHER RADAR ENABLED LOW VISIBILITY OPERATION SYSTEM AND METHOD

CROSS-REFERENCE TO RELATED PATENT APPLICATIONS

The present application is related to U.S. patent application Ser. No. 14/841,558 filed by Jinkins et al. on Aug. 31, 2015, U.S. Pat. No. 8,773,301, U.S. patent application Ser. No. 14/536,330 filed Nov. 7, 2014 by Jinkins et al., now U.S. Pat. No. 9,939,526, U.S. patent application Ser. No. 14/482,681 filed Sep. 10, 2014 by Wood et al., now U.S. Pat. No. 9,733,349, U.S. patent application Ser. No. 14/301,199 filed on Jun. 10, 2014 by McCusker et al., now U.S. Pat. No. 9,384,586, U.S. patent application Ser. No. 13/627,788 filed on Sep. 26, 2012 by Jinkins et al., now U.S. Pat. No. 9,024,805, U.S. patent application Ser. No. 12/892,563 filed on Sep. 28, 2010 by Woodell et al., now U.S. Pat. No. 8,643,533, U.S. patent application Ser. No. 13/250,798 filed on Sep. 30, 2011 by Jinkins et al., now U.S. Pat. No. 9,562,788, U.S. patent application Ser. No. 12/236,464 filed on Sep. 23, 2008 by McCusker et al., now U.S. Pat. No. 8,977,491, U.S. patent application Ser. No. 12/167,200 filed on Jul. 2, 2008 by Woodell et al., now U.S. Pat. No. 7,889,117, U.S. patent application Ser. No. 12/180,293 filed on Jul. 25, 2008 by Woodell et al., now U.S. Pat. No. 8,077,078, U.S. patent application Ser. No. 13/247,742 filed on Sep. 28, 2011 by Wilson et al., now U.S. Pat. No. 8,896,480, U.S. patent application Ser. No. 11/851,323 filed on Sep. 6, 2007 by McCusker, now U.S. Pat. No. 8,515,600, U.S. patent application Ser. No. 11/900,002 on Sep. 26, 2007, now U.S. Pat. No. 7,859,449, U.S. patent application Ser. No. 13/241,051 filed on Sep. 22, 2011 by Tiana et al., now U.S. Pat. No. 8,917,191, U.S. patent application Ser. No. 12/263,282 filed on Oct. 31, 2008 by McCusker et al., now U.S. Pat. No. 9,354,633, U.S. Pat. No. 8,896,480 and U.S. Pat. No. 8,077,078, all of which are herein incorporated by reference in their entireties and assigned to the assignee of the present application.

BACKGROUND

Sensor systems are used by aircraft. For example, an aircraft uses an enhanced vision system (EVS) or enhanced flight vision system (EFVS) to provide imagery sensed by at least one sensor to an aircraft crew. Sensors are often unable to identify required visual references in certain low visibility conditions, such as heavy fog. Heavy fog can be problematic during surface movement, such as taxiing or other surface operations.

Ground based infrastructures have been installed to assist low visibility operations (LVOs). For example, surface movement guidance control systems (SMGCS) allow a control tower to control traffic on the surface of the airport during low visibility operations. However, such ground based infrastructure systems are expensive and are only available at the largest airports.

The Federal Aviation Administration (FAA) regulations, such as, 14 C.F.R. Part 121, do not permit taxi operations when the visibility at the airport is less than 1200 feet runway visual range (RVR). The FAA along with passenger and freight air carriers are evaluating aircraft centric solutions using an enhanced forward looking infrared (FLIR) sensor or 94 gigahertz (GHz) radar that could allow taxi operations to continue during reduced visibility conditions. The FAA has a goal to achieve safe taxi operations for 14 C.F.R Part 121 Air Carriers in visibility conditions as low as 300' RVR.

SUMMARY

In one aspect, embodiments of the inventive concepts disclosed herein are directed to an image processing system for enhanced vision including a radar system, a processor and memory coupled to the processor. The memory contains program instructions that, when executed, cause the processor to instruct the radar system to provide radar beams and receive radar returns with improved angular and/or range resolution for deriving image data of the external scene topography during surface operations. The radar system derives the image data using intensity and location associated with the radar returns determined as a relative location to the radar system.

In a further aspect, embodiments of the inventive concepts disclosed herein are directed to an enhanced vision system including a weather radar system and a display. The weather radar system is configured to generate image data representative of an airport surface environment associated with radar returns received by the weather radar system during surface operations. The radar returns are in an X-band or a C-band, and the weather radar system is configured to process the radar returns. Each of the radar returns is associated with a location determined using an antenna position, an antenna attitude, a beam sharpening angle, and a range. The weather radar system is also configured to process intensity and location associated with the radar returns to provide radar image data. The display is in communication with the weather radar system and configured to display an image associated with the image data.

In a further aspect, embodiments of the inventive concepts disclosed herein are directed to a weather radar system for an aircraft during surface operations. The aircraft includes aircraft sensors. The weather radar system includes an antenna, and a control circuit coupled with the antenna and configured to provide radar beams via the antenna toward external surroundings, to receive radar returns, process data associated with the radar returns to determine the location associated with the radar returns, and process the radar returns with their associated location to provide radar image data for provision of a radar image. The location is determined with a high resolution angle and range.

In a further aspect, embodiments of the inventive concepts disclosed herein are directed to a method of providing a radar image on an electronic display during surface operations. The method includes determining an antenna position, determining an antenna attitude, receiving radar returns from an X-band or C-band airborne weather radar system, and determining a location associated with each of a number of radar returns using an antenna position, an antenna attitude, a beam sharpening angle, and a range, determining an intensity associated with each of a plurality of radar returns. The method also includes providing a radar image on the electronic display. The radar image is derived from the intensity and location associated with the radar returns.

BRIEF DESCRIPTION OF THE DRAWINGS

Implementations of the inventive concepts disclosed herein may be better understood when consideration is given to the following detailed description thereof. Such description makes reference to the annexed drawings, which are not necessarily to scale, and in which some features may be exaggerated and some features may be omitted or may be represented schematically in the interest of clarity. Like reference numerals in the figures may represent and refer to the same or similar element, feature, or function. In the drawings.

DETAILED DESCRIPTION

Figure 1:
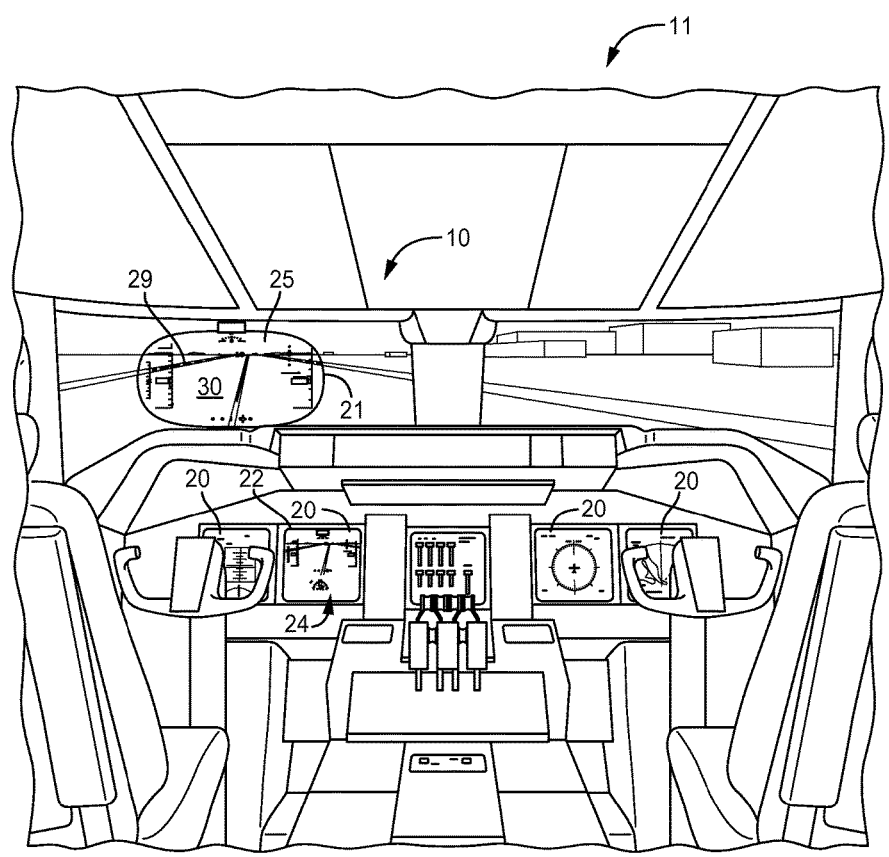
FIG. 1 is a perspective view schematic illustration of an aircraft control center or cockpit according to an exemplary embodiment of the inventive concepts disclosed herein.

Before describing in detail the inventive concepts disclosed herein, it should be observed that the inventive concepts disclosed herein include, but are not limited to, a novel structural combination of data/signal processing components, sensors, and/or communications circuits, and not in the particular detailed configurations thereof. Accordingly, the structure, methods, functions, control and arrangement of components, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the exemplary diagrams, but should be construed in accordance with the language in the claims.

A weather radar based surface operation display system advantageously scans a wide field of view (FOV) (e.g., more than 30 degrees in azimuth) and allows the aircraft to observe any obstacles before the taxiing aircraft commits to making a turn. The weather radar based surface operation display system does not add the additional expense associated with active sensing systems, such as, millimeter wavelength (MMW) radar systems (e.g., 94 GHz) and FLIR cameras that can have limited range in certain low visibility conditions, such as, heavy fog, rain, or other precipitation. The FLIR/camera based systems are generally limited to only seeing ~30 degrees of view directly ahead of the aircraft and cannot see runway painted lines when the airport surfaces are obscured in snow, ice or even heavy rain. Advantageously, using a weather radar system provides greater sensing range than millimeter wavelength radar sensing systems, passive FLIR camera systems or visible light camera systems in low visibility condition in some embodiments. The weather radar system's superior ability to penetrate fog, rain, and snow allows the radar system to detect the runway edge lights during low visibility operations at a much greater distance than passive FLIR or visible light cameras in some embodiments.

In some embodiments, a weather radar is used as an imaging sensor to provide a visualization of the surrounding environment during surface operations. The visualization can be presented to the pilot on a display (e.g., head up display (HUD or head down display (HDD)), thereby allowing the pilot to see the surrounding environment in low visibility conditions. The weather radar system is configured to have sufficient resolution to detect small objects, such as, runway and taxiway edge lights in some embodiments. The weather radar is configured to perform at these higher resolutions by enhancing the angular resolution using beam sharpening with a mono-pulse or sub-aperture technique and/or by enhancing the range resolution using ultra-wideband pulsing, stepped-frequency compression, pulse compression, or other compression techniques in some embodiments.

According to various exemplary embodiments, a display system, such as an EVS, a sensor system, or a radar system, uses radar sensing to provide imagery while surface operations for a pilot or co-pilot. In some embodiments, a Doppler weather radar system is configured to have enhanced resolution (e.g., angular resolution and/or range resolution). Reflectivity of radar returns from runway structures in an airport terminal or runway environment (e.g., an edge light system) are sensed in some embodiments.

In some embodiments, a weather radar system achieves accurate location determination using an accurate beam sharpening angle. In some embodiments, the weather radar system creates a two dimensional or three dimensional grid containing the spatial density of the intensity of the radar returns. Each radar return has an associated location (e.g., location relative to the radar system) that is based on the radar antenna position in some embodiments. From the radar antenna position, the location of the radar returns is found using the attitude of the antenna, the beam sharpening angle and the range (e.g., specific to that individual radar return) in some embodiments. The radar returns are processed to determine the spatial density of the intensity associated with the radar returns. The spatial density of the intensity can be used to generate an image representing the target environment sensed by the radar scan.

Using the weather radar system configured according to some embodiments also provides EVS imagery having sufficient accuracy in low visibility conditions (given that many of the visual references required under Title 14 of the Code of Federal Regulations, part 91, such as approach lighting systems, threshold lighting systems, runway edge lighting systems, and other runway structures, are structures that exhibit high radar reflectivity). The imagery allows low visibility operations at less than 1200 feet RVR or 300 RVR and shows obstacles (e.g., other aircraft, surface vehicles, and other equipment) in the path of the aircraft in some embodiments. In some embodiments, the lack of radar returns from the runway and taxiway surface combined with returns from runway structures and lights can provide a suitable image for runway and taxiway identification by the pilot. A surface map image (e.g., from an SVS or other map system) can be combined with the radar image to provide additional information of the surface environment that can help the pilot navigate on the surface, but the provided surface map image depends on a database and on an absolute positioning and attitude sources for which integrity cannot be guaranteed. The image generated by the radar can be generated using only relative positioning and attitude sources. Combining the two independently created images confirms the alignment and colocation of the radar image and the surface map image in order to validate the integrity of the positioning and attitude sources. The combined independent images also validate the accuracy of realism of the features of the surface map database.

The radar return data is processed to provide a two-dimensional aircraft situation display (e.g., plan view display (e.g., top down)) or a three dimensional exocentric or perspective aircraft situation display representative of taxiway and runway structures in an airport terminal or runway environment based on the radar returns as described in U.S. patent application Ser. Nos. 14/841,558, 14/301,199, 14/482,681 and 14/5363,300 incorporated herein by reference in their entireties in some embodiments. For example, the radar processing circuit can be embodied as a processor and a non-transitory memory containing program instructions that, when executed, cause the processor to instruct the radar system to provide radar beams and receive radar returns via the antenna and generate image data from the radar returns.

According to some embodiments, a radar system, such as, a weather radar system, can be used to sense features of a runway environment. In some embodiments, the regular, periodic, equal spacing nature of visual aids, such as, approach lighting system, runway edge lights, taxi way lights, and/or center line lights, are identified from the image generated from the radar data. In certain embodiments, the systems and methods can be utilized as an extension to a combined vision system (CVS).

Referring to FIG. 1, a vision or display system 10 is provided in an aircraft having an aircraft control center 11 or cockpit. The display system 10 can be used in surface operations, such as, taxi operations, to view the environment during ground operations. The aircraft control center 11 includes displays 20 embodied as head down displays (HDDs) or flight displays. The aircraft control center 11 can also include one or more combiners, such as a combiner 21 associated with a head up display (HUD) system. In some embodiments, the combiner 21 is provided as part of a wearable HUD. Conformal images are provided on the combiner 21 in some embodiments.

The displays 20 and the combiner 21 can be used to provide information to the flight crew, thereby increasing visual range and enhancing decision-making abilities. In some embodiments, the displays 20 and the combiner 21 include a weather display, a joint display, a weather radar surface map and a terrain display. Further, the displays 20 may include images from a synthetic vision system (SVS) or an enhanced vision system (EVS) (e.g., an EFVS). For example, the displays 20 include a display 22 configured to display a perspective image 24, exocentric image, or surface map image of the surface environment of the aircraft. Combiner 21 also or alternatively displays a perspective image 25, an exocentric image or a surface map image of the surface environment of the aircraft in some embodiments Other views of terrain and/or weather information may also be provided (e.g., plan view, horizontal view, vertical view, or combinations thereof). The displays 20 can be implemented using any of a variety of display technologies, including CRT, LCD, organic LED, dot matrix display, and others.

According to some embodiments, the display system 10 is configured to provide an image in response to radar data to at least one of the displays 20 or the combiner 21. In FIG. 1, the perspective image 25 on the combiner 21 includes surface features 29 associated with a runway 30 as viewed from the aircraft (e.g., during surface operations). In some embodiments, at least one of the displays 20 or the combiner 21 displays a combined image of the environment associated with the runway 30 derived from two or more of enhanced vision data, radar data, and surface map data (e.g., SVS data). Advantageously, real time radar data can be provided to provide a real time, all weather detection of the surface features 29 associated with the runway 30 in one embodiment. Advantageously, the radar data allows the runway 30 as well as taxiways and their orientation to be viewed by one or more pilots during low visibility operations in some embodiments.

Figure 2:
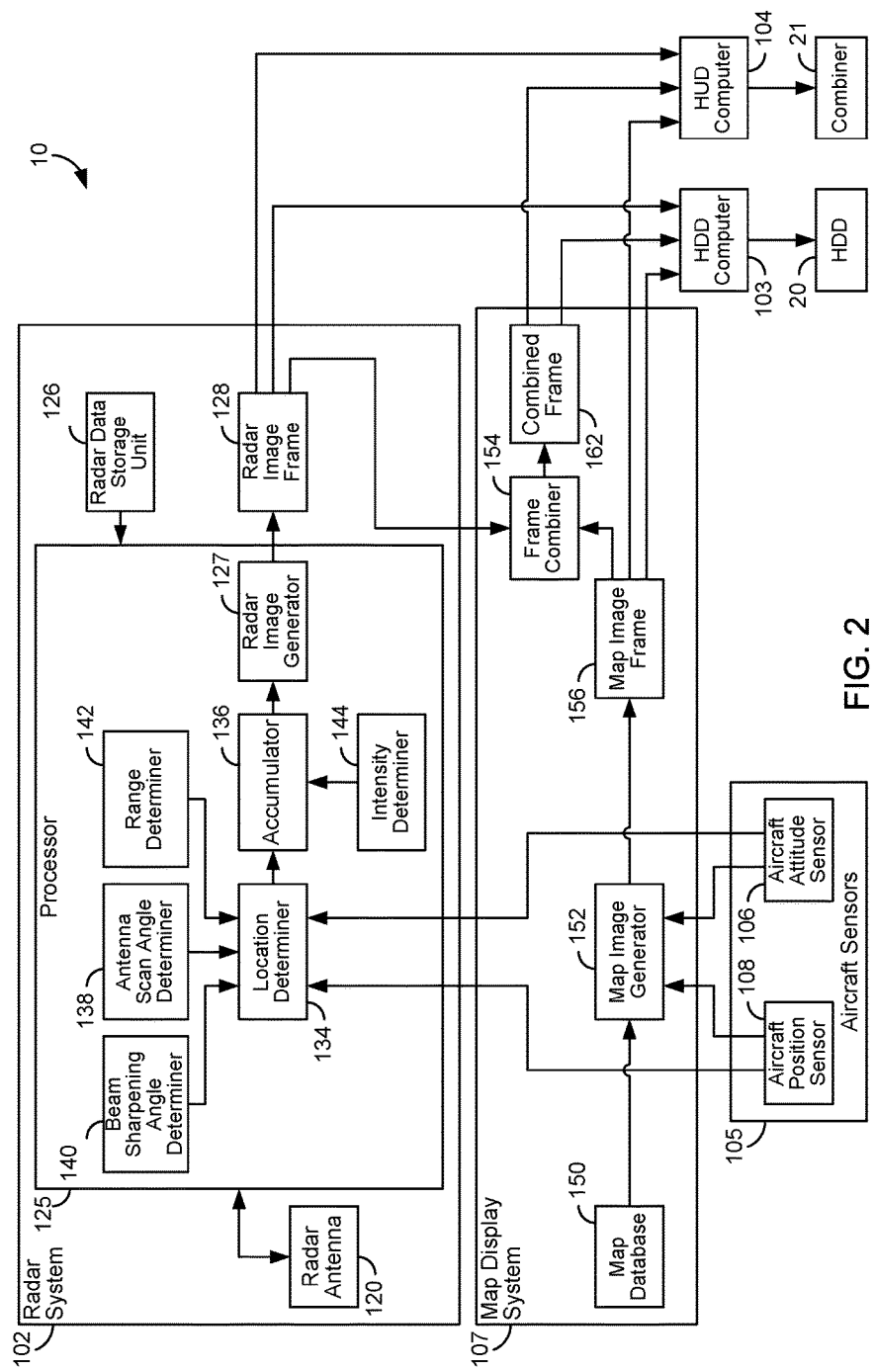
FIG. 2 is a schematic general block diagram of a display system for providing an image derived from radar data according to another embodiment of the inventive concepts disclosed herein.

Referring to FIG. 2, the display system 10 uses radar data from a radar system 102 to provide an image to any of the displays 20 via a HDD computer 103 or the combiner 21 via a HUD computer 104 in some embodiments. The display system 10 is in communication with or includes the radar system 102 and aircraft sensors 105 and can include or be in communication with a map display system 107 (e.g., an SVS and/or an EVS) in some embodiments. The map display system 107 is optional in some embodiments.

The aircraft sensors 105 are associated with navigation equipment and flight control devices in some embodiments and can include one or more of an inertial navigation system (INS), an inertial reference system (IRS), a flight computer, a barometric altimeter, a radar altimeter, a global navigation satellite system (GNSS), air speed sensors, heading sensors, etc. The aircraft sensors 105 include an aircraft attitude sensor 106 and an aircraft position sensor 108 in some embodiments.

The aircraft position sensor 108 is any device or system for providing an electronic signal or data representing aircraft position. In some embodiments, the aircraft position includes a position parameter (e.g., latitude and longitude) and an aircraft altitude parameter. The aircraft position sensor 108 is a GNSS or INS in some embodiments. The aircraft altitude can be provided by a GNSS, an altitude sensor (e.g., barometric sensor), an INS, or other device. In some embodiments, the aircraft position also includes velocity and acceleration parameters associated with aircraft position (e.g., for predicting future position of the aircraft).

The aircraft attitude sensor 106 is any device for providing an electronic signal or data representing attitude of the aircraft. The aircraft attitude includes a heading parameter, a pitch parameter, a yaw parameter, and a roll parameter in some embodiments. In some embodiments, the aircraft position sensor 108 and the aircraft attitude sensor 106 are parts of a single positioning or navigation sensor system, such as a GNSS or INS or an integrated GNSS/INS. In some embodiments, the aircraft attitude also includes angular velocity and acceleration parameters associated with attitude (e.g., for predicting future attitude of the aircraft). In some embodiments, the radar antenna 120 has an attitude sensor for providing attitude and changes in attitude of the radar antenna 120 with respect to the aircraft. The attitude of the radar antenna 120 relative to the attitude of the aircraft can be represented by a scan angle parameter for the radar antenna 120.

The radar system 102 receives data from the aircraft sensors 105 and provides radar image data for display by display system 10. The radar system 102 is a weather radar system generally located inside the nose of the aircraft, inside a cockpit of the aircraft, on the top of the aircraft or on the tail of the aircraft in some embodiments. The radar system 102 includes a radar antenna 120, a processor 125, a radar data storage unit 126, and an image frame memory 128. The radar system 102 can be a weather radar system, such as, a Multiscan™ radar system from Rockwell Collins, Inc. configured as described herein. The radar system 102 utilizes a split, half or sub-aperture or other technique for obtaining radar data associated with external surroundings in some embodiments. The radar system 102 can use the split or sub-aperture techniques of the radar systems described in U.S. application Ser. Nos. 14/841,558, 13/627,788, now U.S. Pat. No. 9,024,805, Ser. No. 12/892,563, now U.S. Pat. No. 8,643,533, Ser. No. 13/250,798, now U.S. Pat. No. 9,562,788, Ser. No. 12/236,464, now U.S. Pat. No. 8,977,491, Ser. No. 12/167,200, now U.S. Pat. No. 7,889,117 and U.S. Pat. No. 8,077,078, incorporated herein by reference in their entirety and assigned to the assignee of the present application. The type of the radar system 102 and data gathering techniques are not discussed in the specification in a limiting fashion.

The processor 125 uses radar data stored in the radar data storage unit 126 and the data from the aircraft sensors 105 to provide and store radar image data in the image frame memory 128. The radar data can be provided directly from the transmit/receive circuits associated with the radar antenna 120 or be stored in the processor 125 in some embodiments. The processor 125 includes a location determiner 134, an accumulator 136, an antenna scan angle determiner 138, a beam sharpening angle determiner 140, a range determiner 142, an intensity determiner 144, and a radar image generator 127. In some embodiments, the radar image generator 127 is separate from the processor 125 and is part of a graphics processor or other display processor. The accumulator 136, the location determiner 134, the radar data storage unit 126, the antenna scan angle determiner 138, the beam sharpening angle determiner 140, the range determiner 142, the intensity determiner 144, and the radar image generator 127 are software modules, circuits, or combinations thereof in some embodiments.

The location determiner 134 uses data from the aircraft sensors 105 and from the radar data storage unit 126, the antenna scan angle determiner 138, the beam sharpening angle determiner 140, and the range determiner 142 to identify a location associated with radar returns received at the radar antenna 120 in some embodiments. The locations are relative to the aircraft or the radar system 102 (e.g., the radar antenna 120 or pilot's position) and are determined without the use of an absolute position source (e.g., a GNSS) in some embodiments. The data associated with the radar returns are stored in the radar data storage unit 126 in some embodiments. The location determiner 134 uses the position of the radar antenna 120, the attitude of the aircraft, the antenna pointing angle, the beam sharpening angle, and the range to determine the location associated with the radar returns in some embodiments. The intensity determiner 144 determines an intensity associated with the radar returns in some embodiments. The intensity of a collection of radar returns are accumulated by location in the accumulator 136 in some embodiments.

The processor 125 causes the radar antenna 120 to provide radar signals or beams and to receive radar returns (e.g., weather radar returns data). The processor 125 is an electronic processor that processes the radar returns and provides the radar data associated with the radar returns to the radar data storage unit 126. The radar signals and radar returns are in the X-band or C-band in some embodiments.

The radar system 102 provides the radar data (e.g., weather radar return data) to the radar data storage unit 126 in one embodiment. The radar data can be processed and filtered for various weather sensing functions as well as location determination functions. In some embodiments, the radar image generator 127 provides the radar image data (e.g., in image frame format) for storage in the image frame memory 128 using the accumulated radar returns in the accumulator 136. In some embodiments, the accumulator 136 determines the spatial density of the intensity by area or volume to create the radar image data. The spatial density of the intensity is used by the radar image generator 127 to provide the radar image data indicative of intensity of radar returns at locations associated with that area or volume.

The image frame memory 128 is a video or graphic electronic memory in some embodiments. The radar image data represents an exocentric, perspective and/or surface map view image in some embodiments. The radar image generator 127 and the accumulator 136 are an electronic memory, processor circuitry, or combination thereof in some embodiments. In some embodiments, the radar image generator 127 and accumulator 136 are part of a digital signal processor or the processor 125 or is a software module executing on the digital signal processor or the processor 125. The radar image generator 127 and accumulator 136 are embodied as a register in some embodiments. The radar data storage unit 126 is an electronic memory in some embodiments.

In some embodiments, a location translation operation is performed by the radar image generator 127 to project the radar return data into radar image data. In some embodiments, the radar image generator 127 is using a projection viewpoint reference for generating the radar image data that is using the same location and attitude reference as the projection viewpoint that the map image generator 152 is using for generating the surface map image data to generate a perspective view, or an exocentric view, or a plan view.

The radar data associated with the external surroundings can represent sensed targets and the location of the sensed targets. Targets include terrain, man-made features, objects, runways, etc. Improved angular resolution and range resolution techniques discussed in U.S. patent application Ser. No. 14/536,330 filed Nov. 7, 2014 by Jinkins et al. incorporated herein by reference in its entirety allows the location of the targets to be more accurately determined and represented in the radar image data in some embodiments. The radar system 102 can utilize clutter suppression and Doppler filtering to improve performance in some embodiments.

In some embodiments, the radar system 102 provides radar data representing a 120 degree field of view in accordance with a weather radar sweep. The sweep can be limited to a 30 degree sweep in certain embodiments. The sweep is directed toward the surface of the Earth so that returns are obtained which allow runway environment features to be sensed. Various types of sweeps, sweep patterns, and sweep speeds can be utilized without departing from the scope of the inventive concepts disclosed herein.

The radar system 102 embodied as a weather radar allows existing avionic equipment to be used as a real-time sensor for providing a radar-derived enhanced image of the external scene topography to the pilot in some embodiments. The image or representation generated by the radar system 102 is provided on the displays 20 or the combiner 21 can function as an EVS to provide situation awareness to the pilot in some embodiments. In some embodiments, the image or representation generated by the radar system 102 is provided on the displays 20 or the combiner 21 can be part of a low visibility operations system approved for use at lower RVR.

The radar system 102 advantageously provides increased range resolution in some embodiments. The increased resolution in range and angle allows a higher resolution for the location determination by the location determiner 134 and hence higher image resolution to be provided on the displays 20 and the combiner 21 in some embodiments.

According to some embodiments, the radar system 102 uses a beam sharpening method to achieve increased angular resolution. In some embodiments, the radar system 102 uses techniques, such as, beam sharpening (e.g., horizontal beam sharpening) and de-convolution of the beam point spread function for improved angular resolution. In some embodiments, the radar system 102 can use beam sharpening as a process that improves the antenna-induced poor angular resolution (e.g., due to the beam width). There are many methods that can be used such as: Monopulse Radar, Sub-Aperture Radar or Split-Aperture Radar, etc. Mathematical methods can be utilized to determine a center of the radar echo for identifying runway features. Techniques for beam sharpening and determining beam sharpening angles and scan angles are discussed in U.S. patent application Ser. No. 13/627,788, filed Sep. 26, 2012, now U.S. Pat. No. 9,024,805; Ser. No. 12/892,563, filed Sep. 28, 2010, now U.S. Pat. No. 8,643,533; Ser. No. 13/250,798, filed Sep. 30, 2011, now U.S. Pat. No. 9,562,788; Ser. No. 12/236,464, filed Sep. 23, 2008, now U.S. Pat. No. 8,977,491; and Ser. No. 12/167,200 filed Jul. 2, 2008, now U.S. Pat. No. 7,889,117; and U.S. Pat. No. 8,077,078 incorporated herein by reference in their entireties.

The radar system 102 uses the radar antenna 120 that toggles between transmitting and receiving on the full aperture and transmitting on the full aperture while receiving on the partial aperture in some embodiments. These techniques can be used to accurately estimate at which angle the measurement was located within the radar beam in some embodiments. The received returns are processed to determine a high resolution estimate of a measurement angle relative to the boresight of the antenna beam in some embodiments. According to some embodiments, the returns are processed using a complex conjugate multiplication method to determine the beam sharpening angle determined by the beam sharpening angle determiner 140. The processing can be related to sequential lobing processing but is executed in the phase domain as opposed to the common amplitude domain in some embodiments.

In some embodiments, the radar system 102 uses sequential lobing techniques where two antennas that are close to the same place may be used, going back and forth between the two antennas. An amplitude signature or phase signature that varies between the two halves of the antennas may be used to obtain data about the location associated with the returned radar reflection from a sensed target (e.g., an object such as other aircraft, terrain, lights, or towers). Sequential lobing generally does not use phase comparisons with moving targets due to Doppler-induced phase changes that contaminate the phase center measurement. However, using a complex conjugate multiply method allows the Doppler-induced phase changes to be removed by cancellation. Therefore, a change in phase center between multiple different sub-apertures may be determined and used to determine the beam sharpening angle associated with the returned radar reflection from a sensed target.

In some embodiments, the effective waveform bandwidth of the radar system 102 is increased to increase range resolution. To provide higher range resolution, the radar system 102 provides ultra-wideband radar (UWB) pulses (e.g., extremely narrow pulses with high power), or provides intra pulse compression (frequency of phase modulation of the transmitted pulse) in some embodiments. Frequency coding techniques including the common linear frequency modulation (LFM) or chirp method and discrete coded segments within the pulse are utilized in some embodiments. Phase coding techniques including binary phase codes as well as various polyphase codes can be utilized in some embodiments. To provide higher range resolution, the radar system 102 provides interpulse pulse compression or stepped frequency compression (e.g., successive pulses with discrete increasing frequency steps) in some embodiments. In some embodiments, stepped frequency compression advantageously achieves high effective bandwidth with narrow instantaneous bandwidth. The receive bandwidth is smaller, has lower noise bandwidth, and a higher signal to noise ratio in some embodiments. Analog-to-digital sampling rates are lower (vs. pulse-compression) in some embodiments. In addition, the stepped frequency compression also has a smaller peak power (e.g., when compared to impulse), provides flexible transmit frequency control, can "hop" over restricted or undesired transmit frequencies, enables adaptive/cognitive frequency use, and rejects later received clutter from earlier transmit pulses in some embodiments. Further, the stepped frequency compression techniques can provide returns from clutter in ambiguous ranges that have frequencies that are different from returns from targets and rejects ambiguous clutter returns in the receiver IF filter of the radar system 102 in some embodiments. Stepped frequency compression generally does not achieve range resolution with a single pulse, requires transmit, receive and processing of a group of pulses for any one bin, and has more pronounced range-Doppler coupling (e.g., different Doppler shifts for each frequency) in some embodiments.

The processor 125 can be any hardware and/or software processor or processing architecture capable of executing instructions and operating on navigational and radar data. The processor 125 can be capable of determining navigational information such as altitude, heading, bearing, location, and changes thereof based on data from the aircraft sensors 105. The processor 125 can be, or can include one or more microprocessors, an application specific integrated circuit (ASIC), a circuit containing one or more processing components, a group of distributed processing components, circuitry for supporting a microprocessor, or other hardware configured for processing.

In some embodiments, the display system 10 includes the map display system 107 including a surface map database 150, a surface map image generator 152, a frame combiner 154, a surface map image frame memory 156, and a combined image frame memory 162. Surface map image frame memory 156 and the combined image frame memory 162 are similar to the image frame memory 128. In some embodiments, the display system 10 is configured to provide a combined image using the radar image data stored in the image frame memory 128 and a surface map image stored in the surface map image frame memory 156.

The surface map image generator 152 is configured to provide an image based upon aircraft position as sensed by aircraft sensors 105 and surface feature data stored in the surface map database 150. The surface map image is generated as an exocentric, perspective, top down and/or plan view in some embodiments.

In some embodiments, the surface map database 150 is memory unit storing surface feature data including airport surface data referenced to absolute coordinate locations. In some embodiments, the surface map image generator 152 and the frame combiner 154 are software modules (e.g., executed on processor 125), circuits, or combinations thereof in some embodiments. A hardware platform associated with the radar system 102 (e.g., the processor 125), an SVS, or an EVS can be used to provide the operations of the map display system 107.

The surface map image generator 152 provides surface map image data in response to absolute position and attitude sensed using aircraft sensors 105. The surface map image data can be referenced to absolute locations. SVS and surface mapping routines can be used to provide the surface map image data in response to position, attitude, and movement. In some embodiments, the map image generator 152 is using a projection viewpoint reference for generating the surface map image data that is using the same location and attitude reference as the projection viewpoint that the radar image generator 127 is using for generating the radar image data to generate a perspective view, or an exocentric view, or a plan view. The surface map image data is stored in surface map image frame memory 156 and can be displayed on the combiner 21 or the displays 20 via HUD computer 104 and HDD computer 103, respectively.

In some embodiments, the frame combiner 154 receives the surface map image data from the surface map image frame memory 156 or surface map image generator 152, receives the radar image data from the image frame memory 128 or the radar image generator 127, and provides combined image data to the combined image frame memory 162. The combined image data can be displayed on the combiner 21 or the displays 20 via HUD computer 104 and HDD computer 103, respectively. In some embodiments, both the surface map image data and the radar image data are generated from the same viewpoint using the same projection method so that both images are in the same location, format and size and are overlaid upon each other to provide the combined image data. In some embodiments, the radar image data is generated only using relative positioning and attitude sources and the surface map image data is generated using absolute positioning and attitude sources. In some embodiments, the radar image data has priority over the surface map image data so that sensed images associated with the radar image data are displayed and not blocked or overwritten by features in the surface map image data. Other merging techniques can be utilized by the frame combiner 154.

Figure 3:
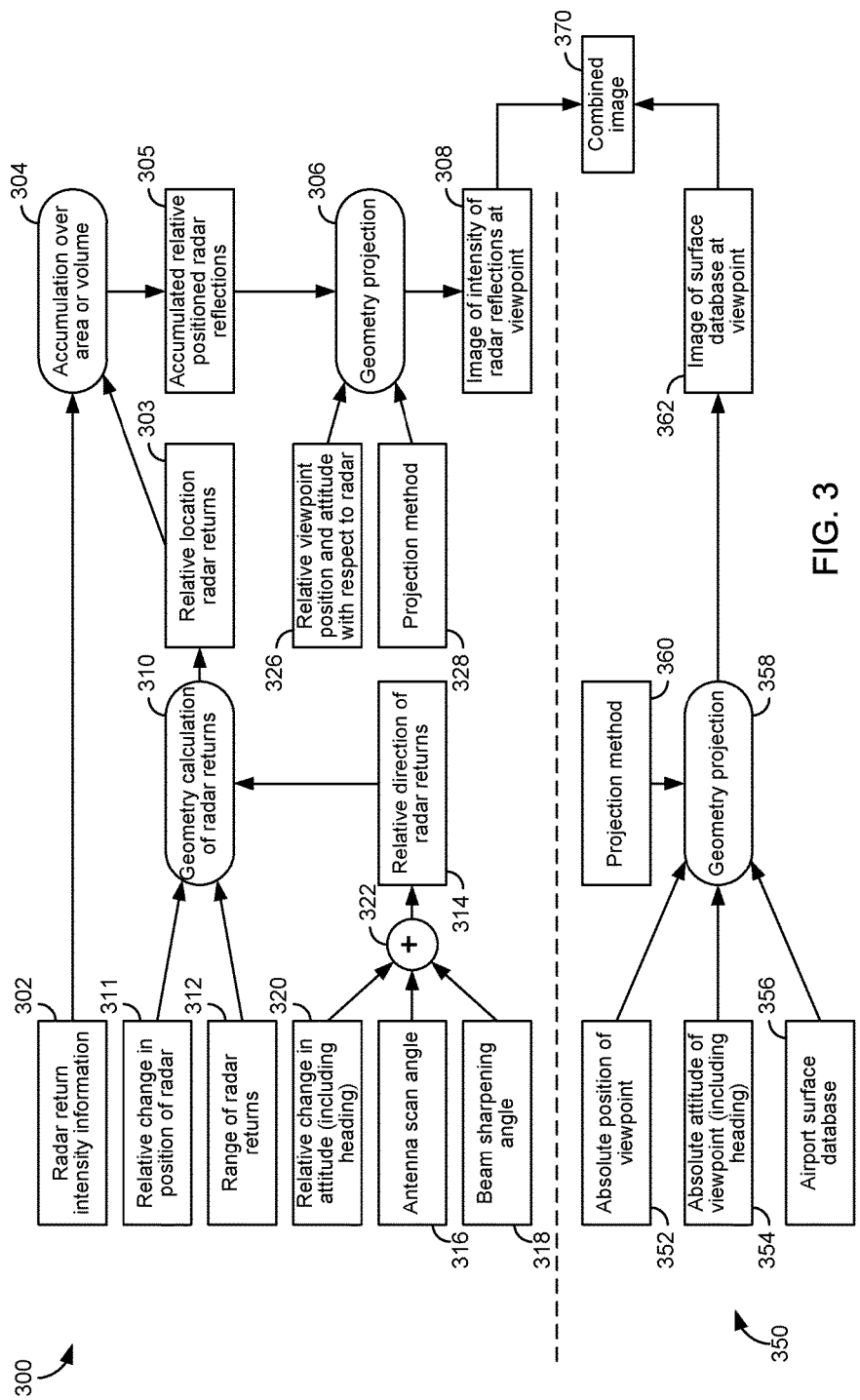
FIG. 3 is a flow diagram showing operations used by the display system illustrated in FIG. 2 to display the image derived from the radar data according to a further exemplary embodiment of the inventive concepts disclosed herein.

With reference to FIG. 3, a flow 300 can be performed by the display system 10 in some embodiments. Flow 300 can be similar to flow 300 discussed in U.S. patent application Ser. No. 14/841,558 filed Aug. 31, 2015, now U.S. Pat. No. 9,024,805. The processor 125, map display system 107, or other computing platform can execute flow 300 to provide an image while the aircraft is involved in surface operations in response to aircraft sensor parameters and radar data. The aircraft sensor parameters from aircraft sensors 105 and the radar returns received by the radar antenna 120 are processed to determine locations and intensity associated with the returned radar reflection to provide locations which have an intensity of the radar return. These radar returns with their associated location and intensity are accumulated over an area or volume at an operation 304. The locations are determined as relative locations from the aircraft, radar system 102 or radar antenna 120 in some embodiments.

A collection of radar returns with associated return intensity parameters 302 are processed on a location basis in the operation 304 using the relative location of the radar returns parameters 303. In some embodiments, the operation 304 accumulates the return intensity parameters 302 by location to provide the spatial density of the intensity parameters 305. In some embodiments, the accumulation step is not performed. The accumulated relative positioned radar returns or spatial density of the intensity parameters 305 are transformed to the desired viewpoint to provide radar image data 308 in an operation 306 using geometric projection in some embodiments. The flow 300 is used to create an image from the accumulated relative positioned radar return data or spatial density of the intensity parameters 305 (e.g., the spatial density of the intensity from the collection of radar returns that each have an associated location and intensity (e.g., the return intensity parameters 302, and relative location of radar returns parameters 302)) in some embodiments. The radar image data 308 is used in enhanced radar image data or combined image data 370 in some embodiments.

In an operation 310, the radar system 102 uses changes in aircraft position and attitude parameters from the aircraft sensors 105 to provide the relative location of radar returns parameters 303 used in the operation 304. The operation 310 uses a relative change in position parameter 311 associated with the radar antenna 120, a range of the radar returns parameter 312, and a relative direction of the radar returns parameter 314 to determine the relative location of radar returns parameters 303. In some embodiments, the radar returns have a relative location with respect to a position at the beginning of a certain timeframe. In some embodiments the start of that timeframe is the start of the data collection that is used to generate the radar data required to generate a single radar image. In some other embodiments the start of that timeframe is the start of a radar scan. The relative locations generated by operation 310 are relative to a position at the beginning of a timeframe and operation 310 accommodates changes in position determined from the relative change in position parameter 311. The operation 310 is a geometry process for the radar returns that places each return in its appropriate location.

The relative direction of the radar returns parameter 314 is determined from an operation 322 which combines an antenna scan angle parameter 316 of the radar antenna 120, a beam sharpening angle parameter 318, and a relative change in attitude (e.g., heading) parameter 320. Aircraft and radar antenna attitude and angular velocity parameters from the aircraft sensors 105 (e.g., pitch, roll, heading, pitch rate, roll rate, yaw rate and scan angle) are used in operation 322 in some embodiments.

The radar system 102 uses an aircraft attitude parameter from the aircraft sensors 105 to perform the operation 322 with the antenna scan angle parameter 316, the beam sharpening angle parameter 318 and the relative change in attitude parameter 320. The operation 322 is a combination operation that provides the relative direction of radar returns parameter 314 in some embodiments.

The heading from the aircraft attitude sensor 106 is the direction of the longitudinal axis of the aircraft with respect to North in some embodiments. The antenna scan angle parameter 316 represents the direction of the boresight of the radar antenna 120 with respect to the heading of the aircraft in some embodiments. The beam sharpening angle parameter 318 represents the radar sensed direction of the radar returns with respect to the boresight of the radar antenna 120 in some embodiments. In some embodiments, heading is not used directly, but instead only changes in the heading are used to determine the relative direction of the radar returns parameter 314. In some other embodiments, the angular velocity parameter that is the derivative of the heading, the heading rate, is used to determine the changes in the heading instead of using the heading. In some embodiments, the relative change in heading is determined relative to the heading at the beginning of a certain timeframe. In some embodiments the start of that timeframe is the start of the data collection that is used to generate the radar data required to generate a single radar image. In some other embodiments the start of that timeframe is the start of a radar scan.

The operation 304 accumulates the radar return intensity parameters 302 based on the relative location of those radar returns 303. The intensity can be sensed as a decibel (dB) value of electromagnetic energy received at the radar antenna 120. All radar returns have a location and intensity value in some embodiments. In some embodiments the intensity is a measure for the power of the reflected radio energy.

The operation 306 provides the radar image data 308 using a relative viewpoint position and attitude with respect to the radar or viewpoint parameters 326 associated with radar antenna 120 and a projection method parameter 328. In some embodiments the image generation operation of 306 using the viewpoint parameters 326 and projection method parameters 328 generates perspective image data, exocentric image data, or surface map image data.

Flow 300 includes an optional flow 350 in some embodiments. Flow 350 is used to provide surface map image data 362 that is provided in the combined image data 370. The operation 358 uses geometry projection to provide the surface map image data 362 using projection parameters 360, an absolute position of a viewpoint 352, an absolute attitude of a viewpoint 354, and surface map data 356. The surface map image data 362 is generated using the same position and attitude of the viewpoint as used for generation of the radar image data 308 in operation 306, but for operation 358 the absolute position values of the viewpoint 352 and absolute attitude values of the viewpoint 354 are used instead of relative position and attitude values of the viewpoint. In some embodiments the image generation operation of 358 using viewpoint parameters 352 and 354 and projection parameters 360 generates perspective image data, exocentric image data, or surface map image data. The surface map image data 362 is combined with the radar image data to provide the combined image data 370 from the same viewpoint with the same projection method in some embodiments. Various image generation routines also used for synthetic vision and surface mapping can be utilized in the operation 358.

In some embodiments, a pilot can ascertain if there is a mismatch error by observing the combined image associated with the combined image data 370. In some embodiments, a pilot can ascertain if there is an obstacle in the path of the aircraft by observing the combined image associated with the combined image data 370 or the radar image associated with the radar image data 308.

Figure 4:
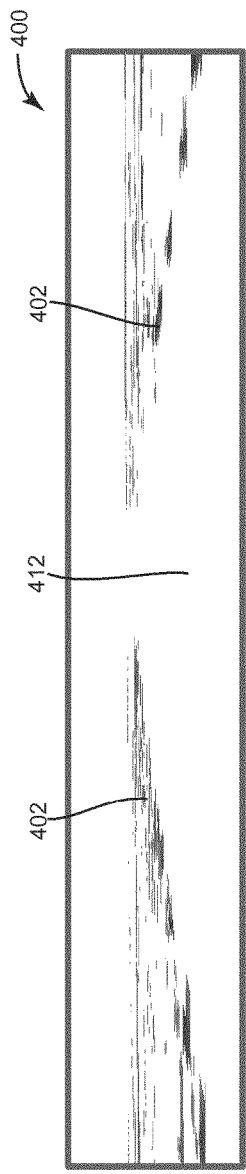
FIG. 4 is an illustration of a perspective image of an airport surface environment derived from radar data provided by the display system illustrated in FIG. 2 according to yet another exemplary embodiment of the inventive concepts disclosed herein.

With reference to FIG. 4, an image 400 of the external scene derived from the radar data associated with the radar returns includes features 402 associated with taxiway or runway edge lights of a runway 412. An absence of return energy is associated with the taxiway or runway 412 in some embodiments. Image 400 is a perspective view from the pilot's eye and is suitable for display on the combiner 21 as a conformal image with the real world view in some embodiments. Image 400 is provided using the radar data referenced locally to the aircraft and without absolute data from a GNSS or other absolute positioning system in some embodiments.

Figure 5:
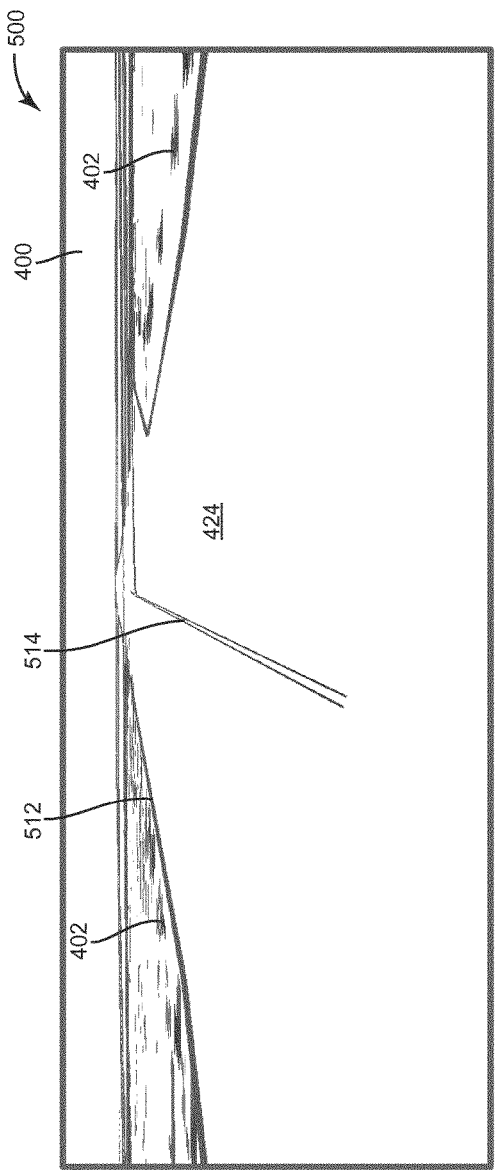
FIG. 5 is an illustration of a combined perspective image including an image derived from surface map data and an image derived from the radar data associated with the image illustrated in FIG. 4 according to yet another exemplary embodiment of the inventive concepts disclosed herein.

With reference to FIG. 5, an image 500 includes the image 400 derived from the radar data associated with the radar returns and a surface map image derived from surface map image data. The surface map image includes surface features 512 associated with a taxiway or runway edge and a feature 514 associated with a taxiway or runway centerline which are derived from data in the map database 150. Image 500 is a perspective view from the pilot's eye and is suitable for display on the combiner 21 as a conformal image with the real world view in some embodiments.

Figure 6:
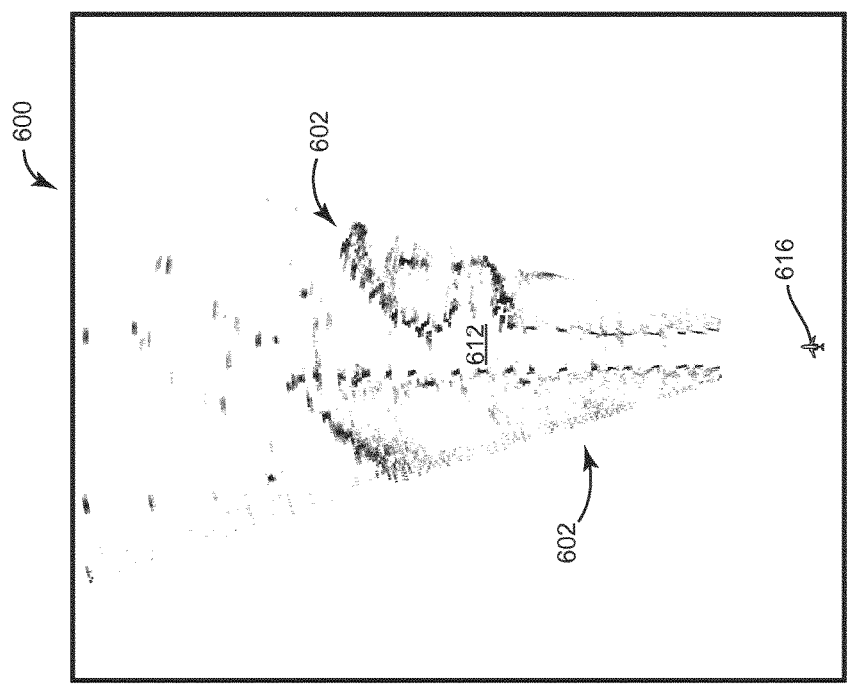
FIG. 6 is an illustration of a top down image of an airport surface environment derived from radar data provided by the display system illustrated in FIG. 2 according to yet another exemplary embodiment of the inventive concepts disclosed herein.

With reference to FIG. 6, an image 600 of the external scene derived from the radar data associated with the radar returns includes features 602 associated with taxiway or runway edge lights of a taxiway 612 or runway. An absence of return energy is associated with the taxiway 612 in some embodiments. Image 600 is a top down view. Image 600 is provided using the radar data referenced locally to an aircraft 616 including the radar system 102 and without absolute data from a GNSS or other absolute positioning system in some embodiments.

Figure 7:
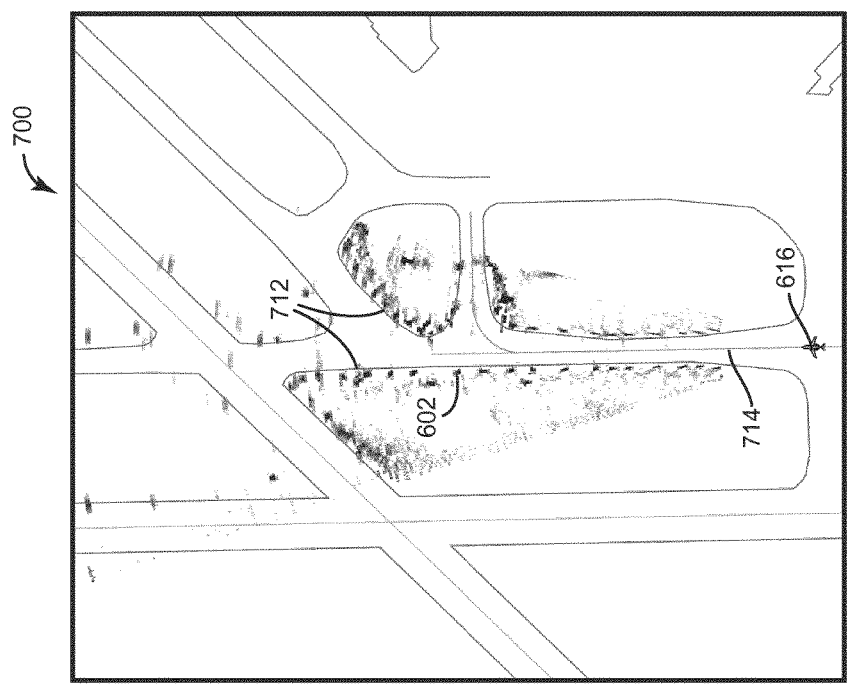
FIG. 7 is an illustration of a combined top down image including an image derived from surface map data and an image derived from the radar data associated with the image illustrated in FIG. 6 according to yet another exemplary embodiment of the inventive concepts disclosed herein.

With reference to FIG. 7, an image 700 includes the image 600 derived from the radar image data associated with the radar returns and a surface map image derived from surface map image data. The surface map image data provides image features 712 associated with the edge of the taxiway 612 or runway and a feature 714 associated with a taxiway or runway centerline which are derived from data in the map database 150. Image 700 is generated as a top down view.

Figure 8:
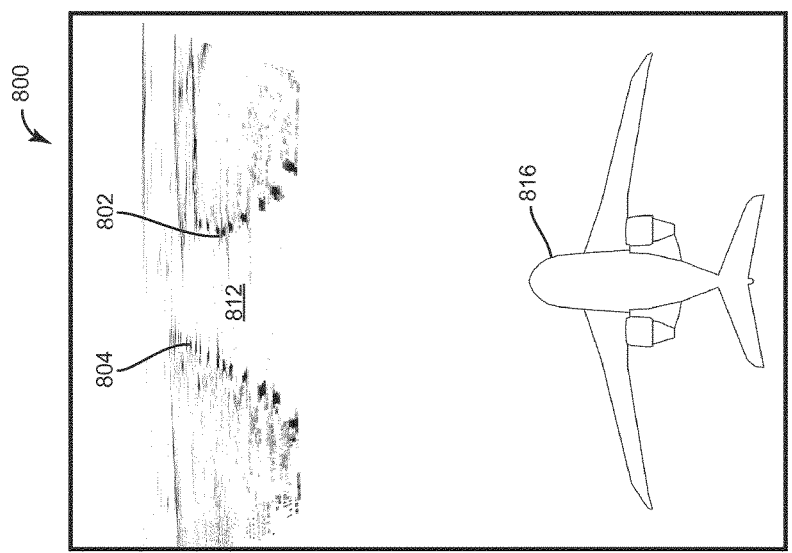
FIG. 8 is an illustration of an exocentric image of an airport surface environment derived from radar data provided by the display system illustrated in FIG. 2 according to yet another exemplary embodiment of the inventive concepts disclosed herein.

With reference to FIG. 8, an image 800 of the external scene derived from the radar data associated with the radar returns includes features 802 associated with taxiway or runway edge lights of a taxiway 812 or runway. An absence of return energy is associated with the taxiway 812 or runway in some embodiments. Image 800 is generated as an exocentric view. Image 800 is provided using the radar data referenced locally to an aircraft 816 including the radar system 102 and without absolute data from a GNSS or other absolute positioning system in some embodiments.

Figure 9:
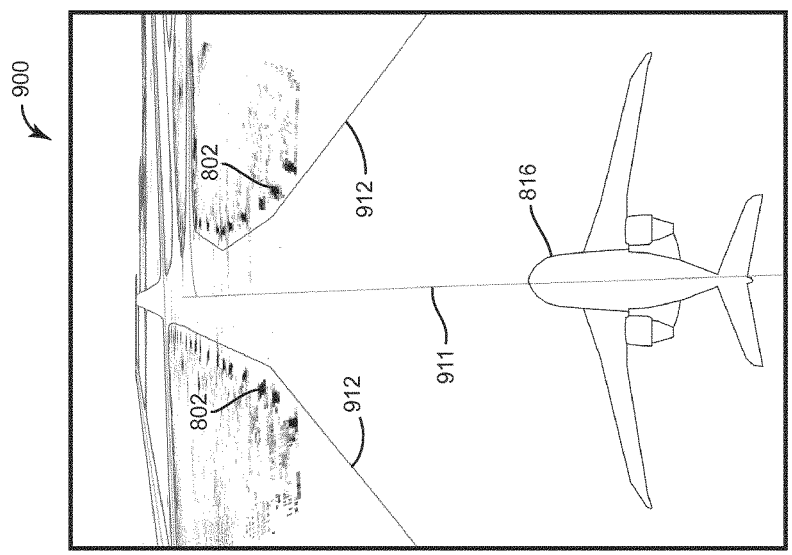
FIG. 9 is an illustration of an exocentric combined image including an image derived from surface map data and an image derived from the radar data associated with the image illustrated in FIG. 8 according to yet another exemplary embodiment of the inventive concepts disclosed herein.

With reference to FIG. 9, an image 900 includes the image 800 derived from the radar data associated with the radar returns and a surface map image derived from surface map image data. The surface map image data provides image features 912 associated with a taxiway or runway edge and a feature 911 associated with a taxiway or runway centerline. Image 900 is generated as an exocentric view.

Figure 10:
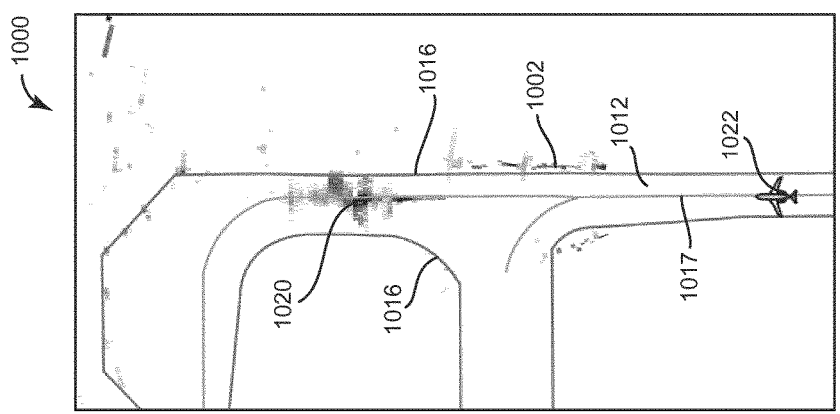
FIG. 10 is an illustration of a combined top down image including an image derived from surface map data and an image derived from the radar data provided by the display system illustrated in FIG. 2 according to yet another exemplary embodiment of the inventive concepts disclosed herein.

With reference to FIG. 10, an image 1000 is a top down view image derived from the radar data associated with the radar returns and a surface map image derived from surface map image data. The image derived from the radar data associated with the radar returns includes features 1002 associated with edge lights of a taxiway 1012 or runway. The surface map image data provides image features 1016 associated with a taxiway or runway edge and a feature 1017 associated with a taxiway or runway centerline. The image 1000 shows an obstacle 1020 in the path of aircraft 1022. Obstacle 1020 is an aircraft sensed by radar system 102 associated with aircraft 1022 during low visibility operations.

Figure 11:
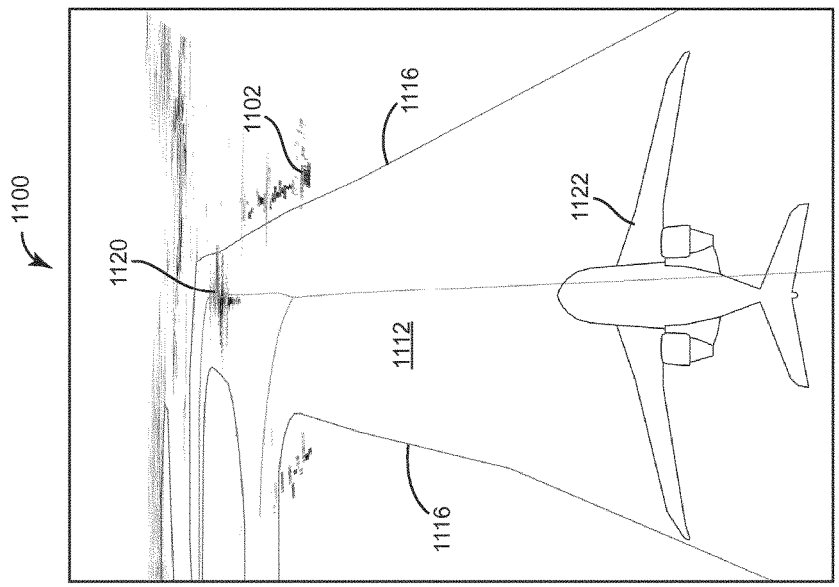
FIG. 11 is an illustration of a combined exocentric image including an image derived from surface map data and an image derived from the radar data associated with the image illustrated in FIG. 10 according to yet another exemplary embodiment of the inventive concepts disclosed herein.

With reference to FIG. 11, an image 1100 is an exocentric view image derived from the radar data associated with the radar returns and a surface map image derived from surface map image data. The image derived from the radar data associated with the radar returns includes features 1102 associated with taxiway or runway edge lights of a taxiway 1112 or runway. The surface map image data provides image features 1116 associated with a taxiway or runway edge. The image 1100 shows an obstacle 1120 in the path of aircraft 1122. The obstacle 1120 is an aircraft sensed by the radar system 102 associated with aircraft 1122 during low visibility operations.

Figure 12:
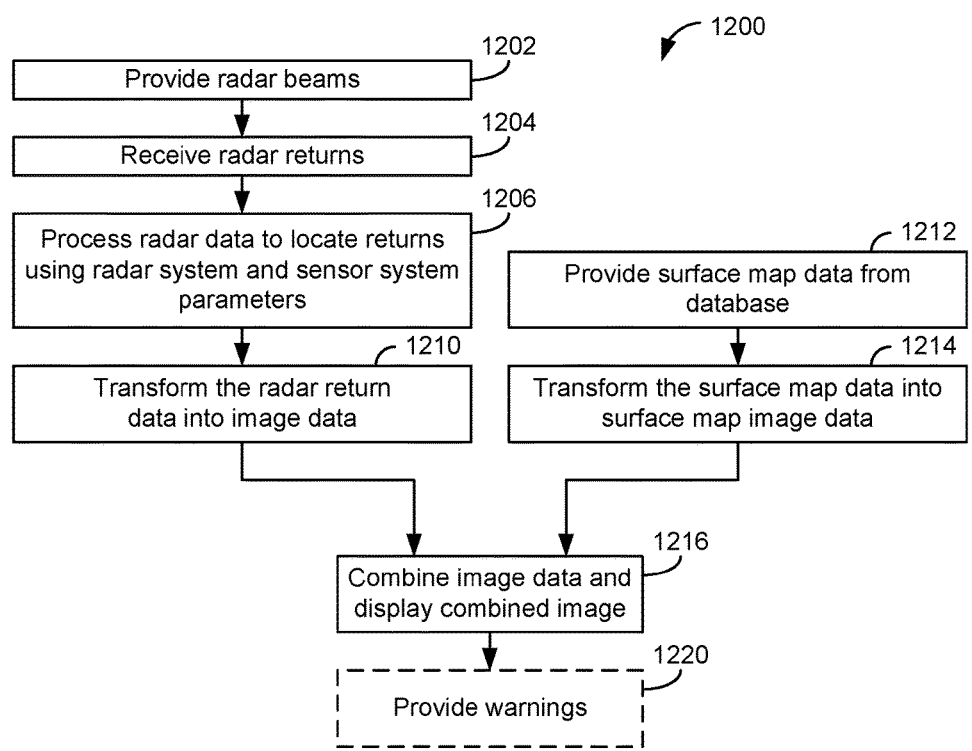
FIG. 12 is a flow diagram showing operations for the generation of image data for the display system illustrated in FIG. 2 in accordance with some embodiments of the inventive concepts disclosed herein.

With reference to FIG. 12, a flow 1200 can be performed by the display system 10 in some embodiments. The processor 125 or other computing platform can execute flow 1200 to provide an image in response to aircraft sensor parameters and radar data. At an operation 1202 radar beams are provided by the radar antenna 120. At an operation 1204, radar returns are received by the radar antenna 120. At an operation 1206, the radar data and aircraft sensor data associated with the radar returns are processed to provide the location of the radar returns. In some embodiments, the radar system 102 provides data representing a 120 degree field of view in accordance with a weather radar sweep in one embodiment. The width of the sweep can be limited during surface operations to provide the radar data for a 30-40 degree wide display in certain embodiments. In some embodiments the sweep can be horizontally directed in the direction of the turn to provide radar data of the area where the aircraft is steering towards. The sweep is directed toward the surface of the Earth so that returns are obtained which allow a surface image to be created. Various types of sweeps, scans and timings of sweeps and scans can be utilized without departing from the scope of the invention.

The radar data is processed to determine the intensity and location of the radar returns. The locations of the radar returns are determined using the radar data and parameters from the aircraft sensors 105 (e.g., according to flow 300) in some embodiments. At an operation 1210, radar image data is generated from the radar returns with their associated intensity and location data. The radar image data is generated based on a transformation using a viewpoint and projection method. The location of the viewpoint is relative to the radar system 102 in some embodiments. At an operation 1212, surface map data is provided from a surface map database. At an operation 1214, surface map image data is generated from the surface map data. The surface map image data is generated based on a transformation using a viewpoint and projection method. The location of the viewpoint is related to the absolute coordinates of the surface map database in some embodiments. In some embodiments the viewpoint location and projection method for operation 1210 and operation 1214 are the same, even though the viewpoint location can be referenced relative or absolute for operations 1210 and 1214. At an operation 1216, the radar image data from operation 1210 and surface map image data from operation 1214 is combined to provide combined image data for display.

In some embodiments the combined image data can be from the perspective of the pilot's eye in the aircraft flight deck. In some other embodiments the combined image data can be from the perspective of a viewpoint behind the aircraft directed towards the aircraft also known as an exocentric perspective. In yet other embodiments the combined image data can be from the perspective of a viewpoint above the aircraft directed down towards the aircraft also known as a top down perspective. The locations of the viewpoints are derived from aircraft attitude, velocity and positioning sources, such as the aircraft sensors 105. Operation 1216 combines the images in such a way that the identity of the two image sources is still maintained in some embodiments. The display system 10 combines or fuses the independently created images from both the surface map database (e.g., SVS database) and the images derived from radar data from the radar system 102 to confirm the integrity of the positioning and attitude source along with the accuracy of the surface map database according to some embodiments.

In some embodiments, the surface map image data and the radar image data are compared and warnings are provided if there is a mismatch in an operation 1220. For example, if edge lights detected in the radar image data are not within a tolerance for locations for such lights in the surface map data, a data mismatch error is provided. In some embodiments, the pilot or flight crew can observe a mismatch error based upon edge lights being out of alignment with the edge of the runway in the surface map image.

Various matching algorithms can be utilized to determine if the radar image data and the surface map image data are mismatched. The compare function generally looks for specific airport features and performs such comparisons on a regular, repeated, periodic schedule (e.g., every couple of seconds). In some embodiments, surface features, such as runway features, can be matched. Runway features are readily ascertainable from radar data. If the compare function indicates that there is not a match, a monitor indicates there may be a database error or an error with the radar system 102 or a positioning or attitude error associated with the aircraft sensors 105. The indication can be provided on the combiner 21 or on the displays 20.

The scope of this disclosure should be determined by the claims, their legal equivalents and the fact that it fully encompasses other embodiments which may become apparent to those skilled in the art. All structural, electrical and functional equivalents to the elements of the above-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

Embodiments of the inventive concepts disclosed herein have been described with reference to drawings. The drawings illustrate certain details of specific embodiments that implement the systems and methods and programs of the present disclosure. However, describing the embodiments with drawings should not be construed as imposing any limitations that may be present in the drawings. The present disclosure contemplates methods, systems and program products on any machine-readable media for accomplishing its operations. Embodiments of the inventive concepts disclosed herein may be implemented using an existing computer processor, or by a special purpose computer processor incorporated for this or another purpose or by a hardwired system.

Embodiments in the inventive concepts disclosed herein have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

What is claimed is:

1. A weather radar system for an aircraft engaged in surface operations, the aircraft comprising aircraft sensors, the weather radar system comprising:
   an antenna; and
   a control circuit coupled with the antenna and configured to:
   provide radar beams via the antenna toward external surroundings associated with the surface operations;
   receive radar returns;
   process data associated with the radar returns to determine location associated with each of the radar returns, wherein the location is determined using an angle and a range, wherein the angle is determined using at least the following parameters: relative change in attitude, a beam sharpening angle, and an antenna scan angle; and
   process the radar returns with their associated location to provide radar image data for provision of a radar image.

2. The weather radar system of claim 1, wherein the control circuit is configured to:
   determine the relative change in attitude using the aircraft sensors.

3. The weather radar system of claim 2, wherein the radar image is provided using only relative attitude and positioning data sources from the aircraft sensors.

4. The weather radar system of claim 3, wherein the position and attitude of the antenna is changing during the collection of radar return data, the changes of the position and attitude of the antenna are determined using aircraft sensors and radar system sensors, and any position and attitude changes of the antenna are determined relative to the position and attitude of the antenna at a certain point in time.

5. The weather radar system of claim 2, wherein the beam sharpening angle is a radar sensed direction of a radar return with respect to an attitude of the antenna.

6. The weather radar system of claim 5, wherein the beam sharpening angle is generated using a monopulse technique, a sub-aperture radar technique, deconvolution of a beam point spread function, or any combination thereof.

7. The weather radar system of claim 2, wherein the range is the radar sensed distance between the location of the antenna and a location associated with a radar return.

8. The weather radar system of claim 2, wherein the control circuit is configured to provide combined data, the combined data being comprised of surface map data and the data derived from the radar returns for provision of the radar image, the combined data representing a combined image.

9. A method of providing a radar image on an electronic display during surface operations, the method comprising:
   determining an antenna position,
   determining an antenna attitude;
   receiving radar returns from an X-band or C-band aircraft weather radar system;
   determining a location in an environment of the surface operations associated with each of a plurality of radar returns using the antenna position, the antenna attitude, a beam sharpening angle, and a range;
   determining an intensity associated with each of a plurality of radar returns; and
   providing a radar image on the electronic display, the radar image being derived from the intensity and the location associated with each of the radar returns.

10. The method of claim 9, wherein the X-band or C-band aircraft weather radar system comprises a switched aperture, sequential lobing or monopulse weather radar system, and wherein the radar image is a three dimensional or two dimensional real time image.

11. The method of claim 9, wherein the beam sharpening angle is generated using a monopulse technique, a sub-aperture radar technique, deconvolution of a beam point spread function, or any combination thereof.

12. The method of claim 11, wherein the radar image is combined with a surface map image associated with a surface map database.

13. The method of claim 12, wherein the surface map database is an airport surface map database.

14. The method of claim 9, further comprising:
comparing data associated with the radar image to data associated with the surface map image to confirm alignment and colocation of the radar image and the surface map image in order to confirm the integrity of the positioning and attitude sources along with the integrity of features of the surface map database.

15. An enhanced vision system for an aircraft engaged in surface operations, comprising:
a weather radar system configured to:
generate image data representative of a surface environment associated with the surface operations using radar returns received by the weather radar system, the radar returns being in an X-band or a C-band,
process radar returns, wherein each of the radar returns is associated with a location determined using an antenna position, an antenna attitude, a beam sharpening angle, and a range;
process intensity and the location associated with the radar returns to provide radar image data, wherein the direction is determined using at least the antenna position and the beam sharpening angle; and
a display in communication with the weather radar system and configured to display an image associated with the radar image data.

16. The enhanced vision system of claim 15, wherein the radar image data is combined with surface map image data associated with a surface map database.

17. The enhanced vision system of claim 16, wherein the image data derived from surface map data and the radar image data are compared to determine a mismatch error.

18. The enhanced vision system, of claim 15, wherein the beam sharpening angle is a radar sensed direction of a radar return with respect to the attitude of an antenna.

19. The enhanced vision system of claim 15, wherein the beam sharpening angle is generated using a monopulse technique, a sub-aperture radar technique, deconvolution of a beam point spread function, or any combination thereof.

20. The enhanced vision system of claim 15, wherein the radar image data is compared to surface map image data to check integrity of aircraft location and orientation or integrity of the surface map data.

* * * * *